(12) United States Patent
Stallings et al.

(10) Patent No.: US 8,451,247 B2
(45) Date of Patent: *May 28, 2013

(54) MORPHING TOUCH SCREEN LAYOUT

(75) Inventors: Heath Stallings, Colleyville, TX (US); Sok Y. Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,340

(22) Filed: May 23, 2012

(65) Prior Publication Data

US 2012/0229519 A1    Sep. 13, 2012

Related U.S. Application Data

(63) Continuation of application No. 12/340,243, filed on Dec. 19, 2008, now Pat. No. 8,217,910.

(51) Int. Cl.
*G06F 3/041* (2006.01)

(52) U.S. Cl.
USPC .......................... 345/173; 715/796; 715/800

(58) Field of Classification Search
None
See application file for complete search history.

(56) References Cited

U.S. PATENT DOCUMENTS

| 2009/0183098 A1 | 7/2009 | Casparian et al. |
| 2009/0256857 A1 | 10/2009 | Davidson et al. |
| 2010/0026723 A1 | 2/2010 | Nishihara et al. |
| 2010/0066764 A1 | 3/2010 | Refai |

*Primary Examiner* — Jason Olson

(57) ABSTRACT

A device displays one or more display elements on a touch screen associated with the device, and detects interaction of a finger, associated with a user of the device, with the touch screen. The device also calculates one or more touch areas associated with the finger based on the detected interaction, and resizes, reshapes, and/or relocates the one or more display elements based on the calculated one or more touch areas.

20 Claims, 21 Drawing Sheets

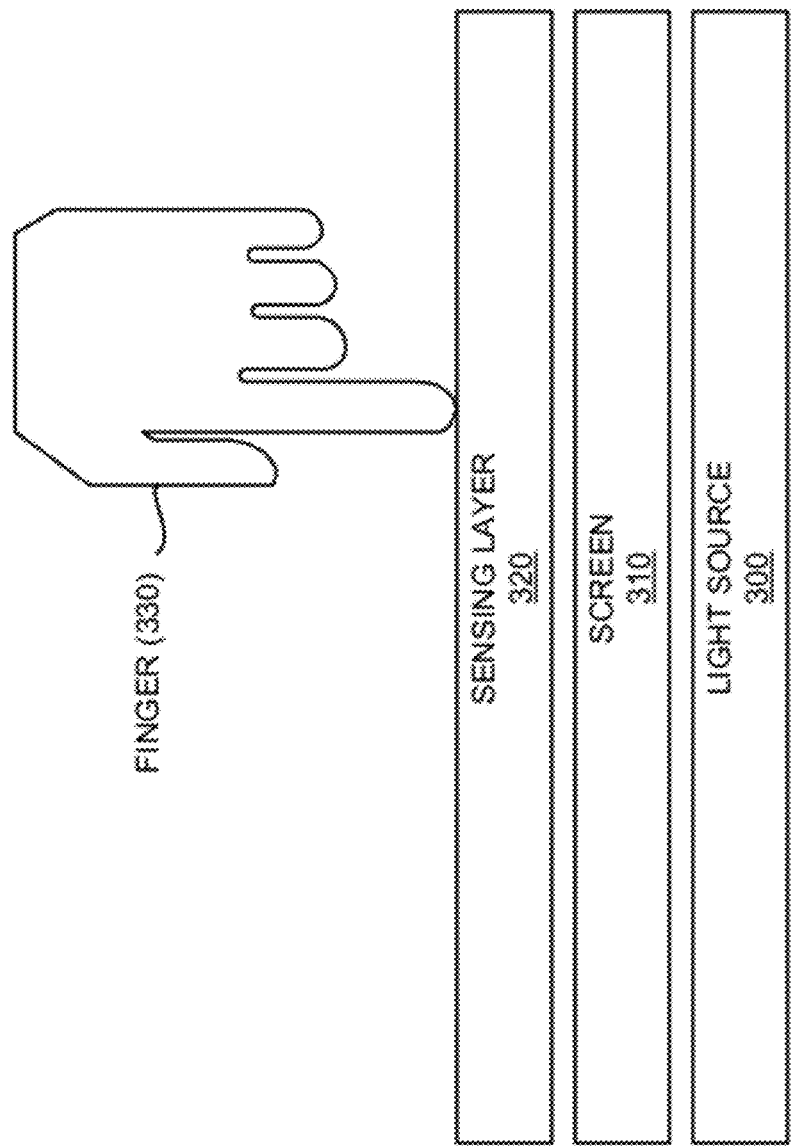

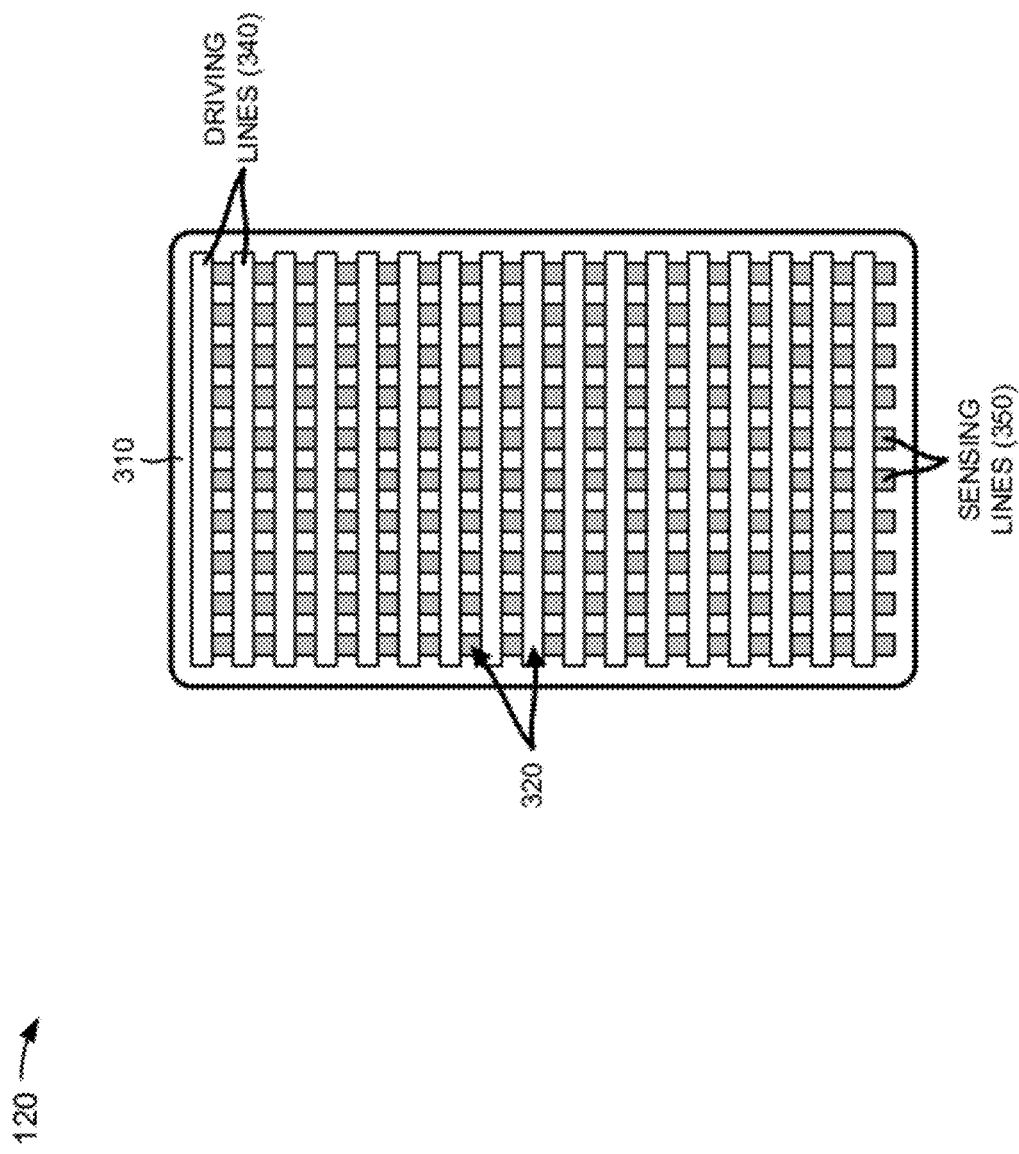

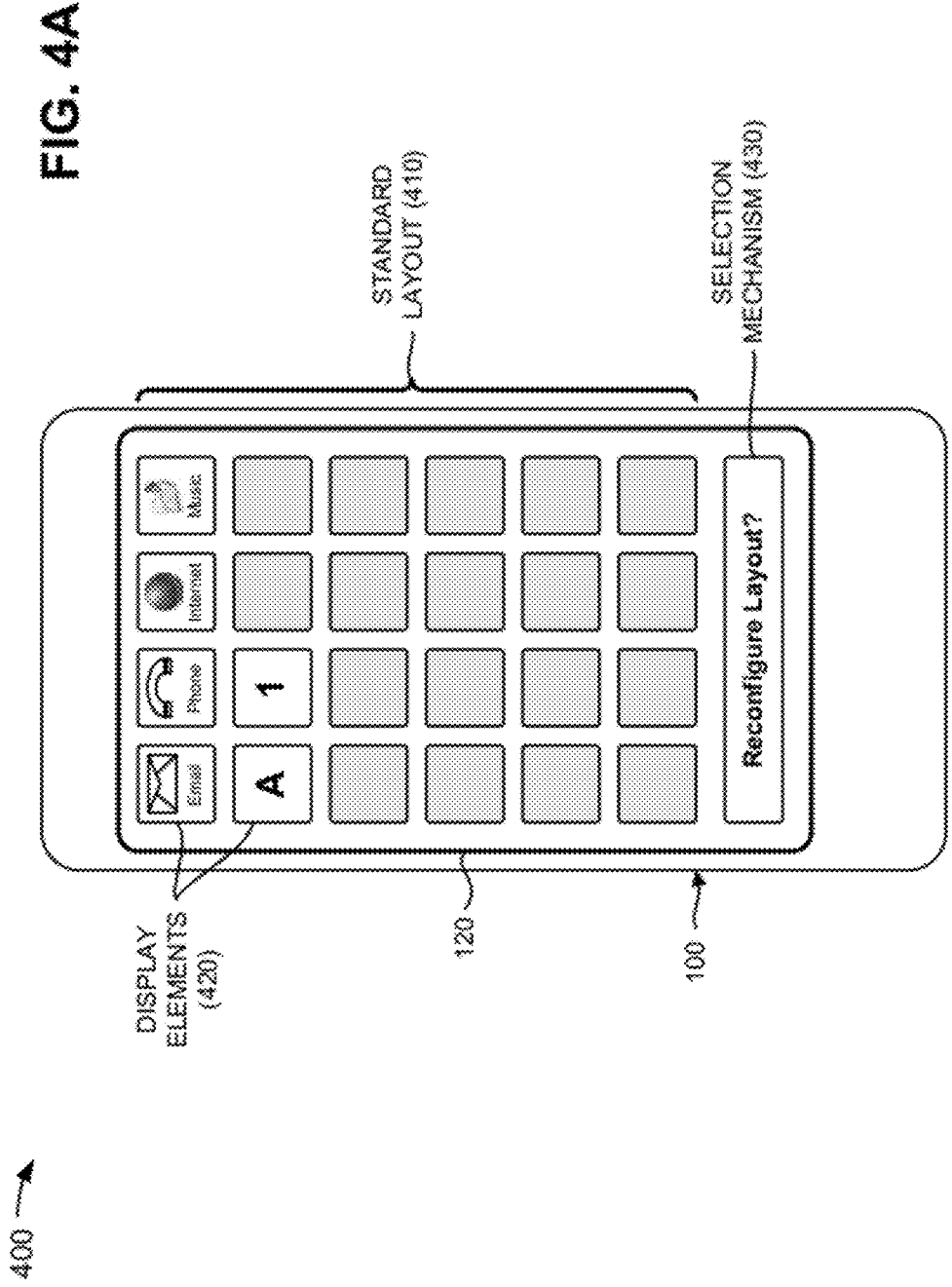

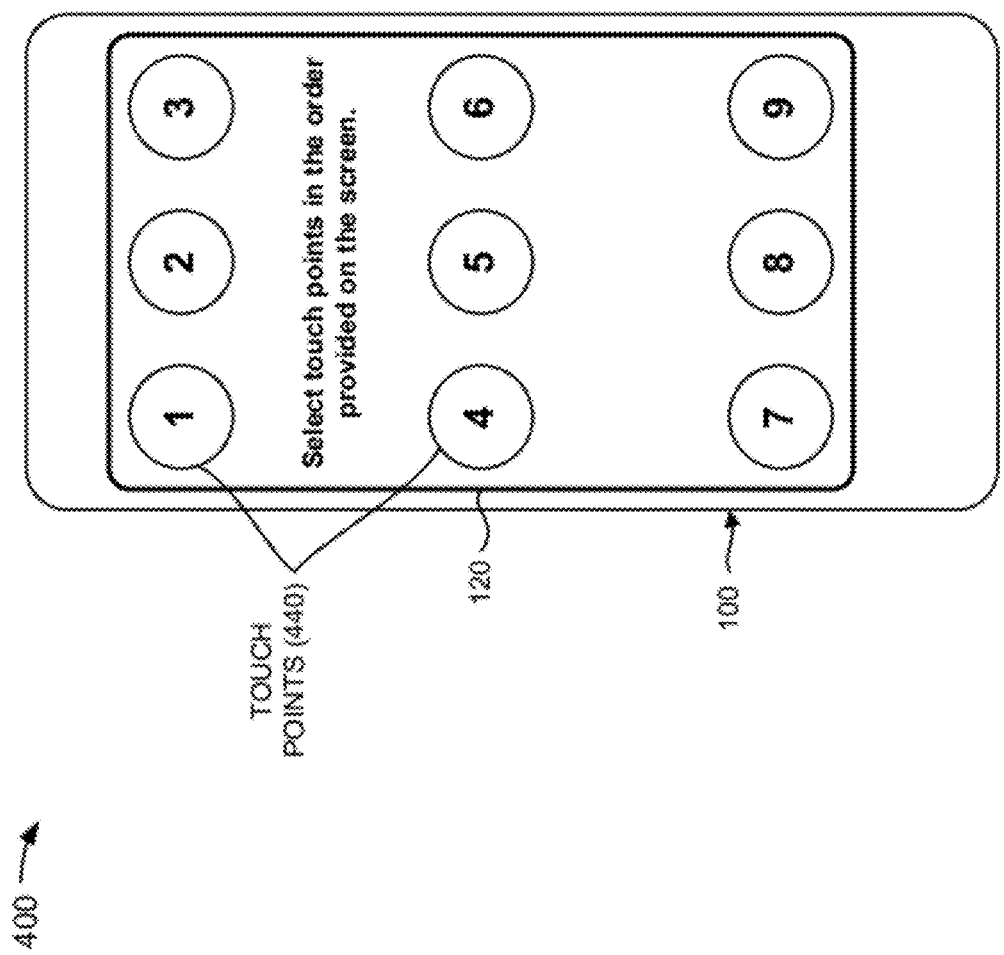

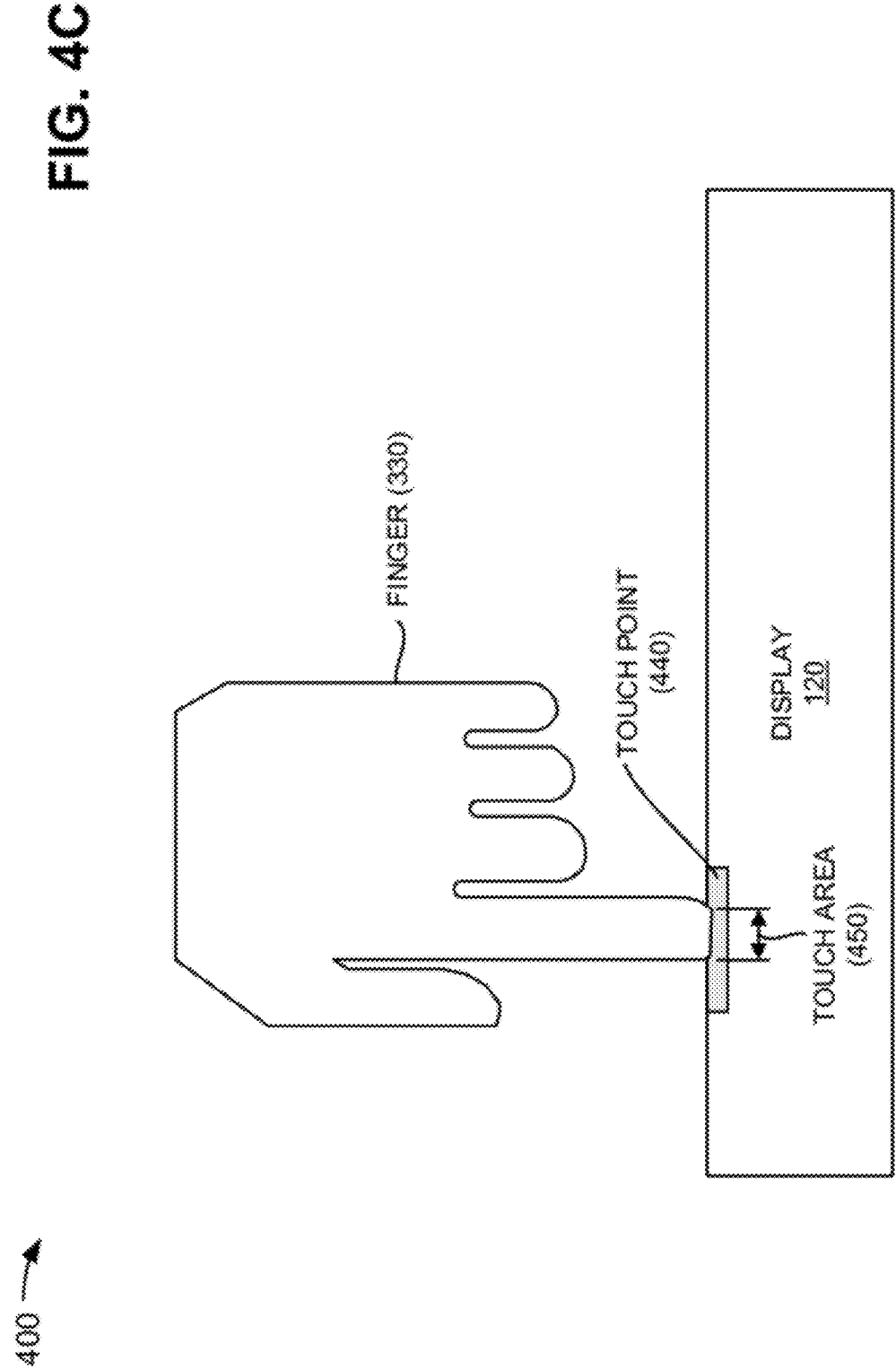

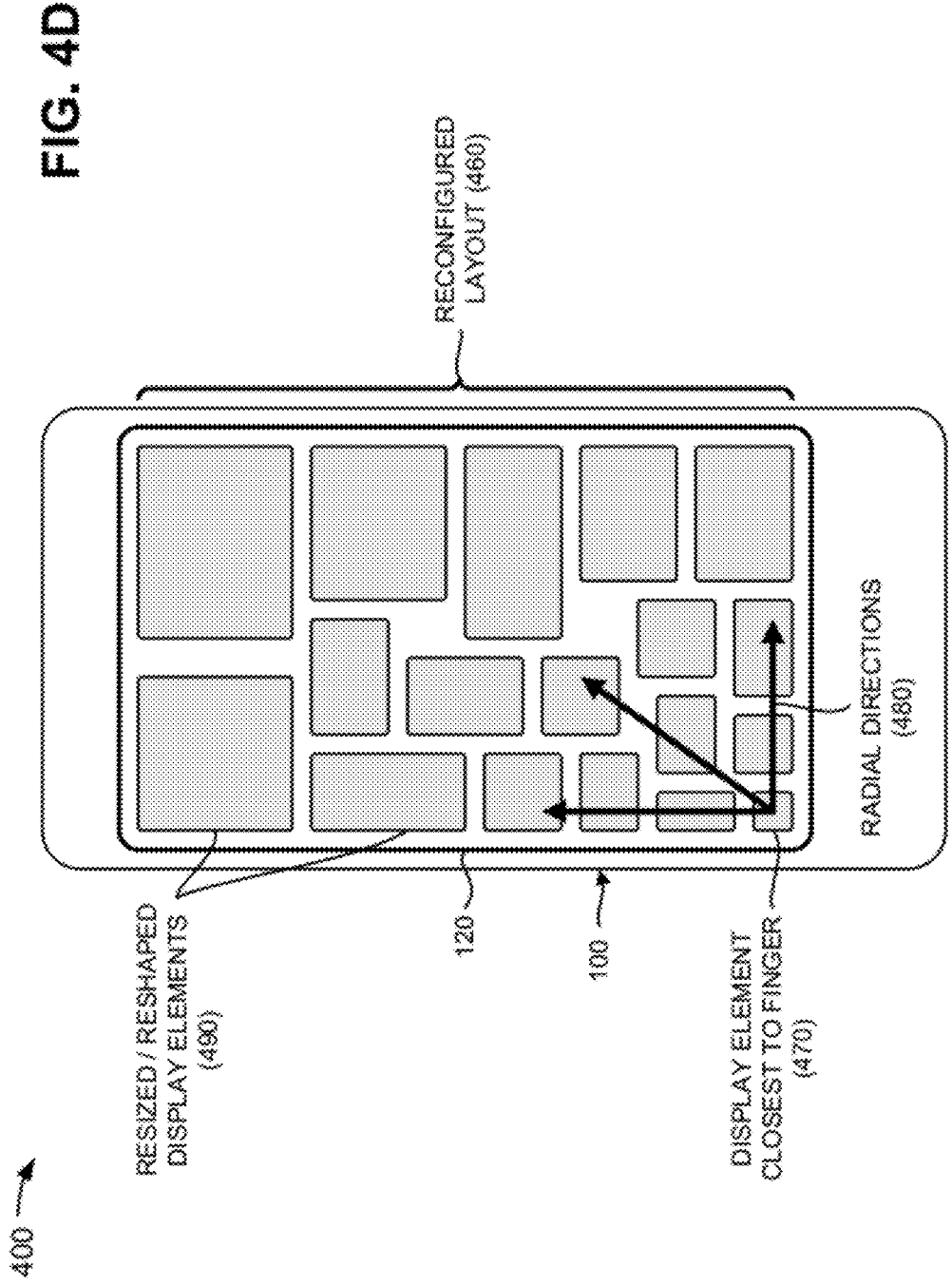

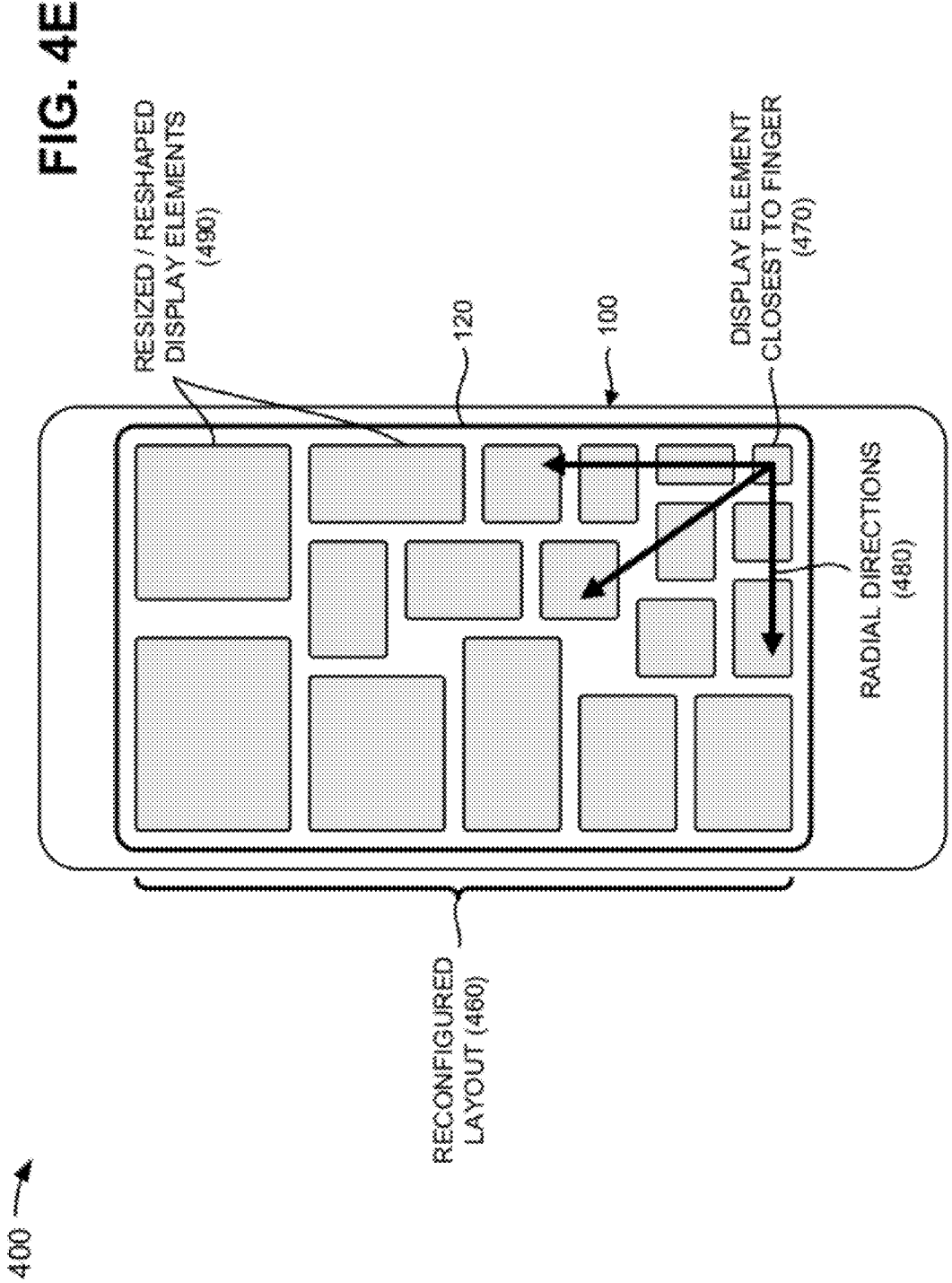

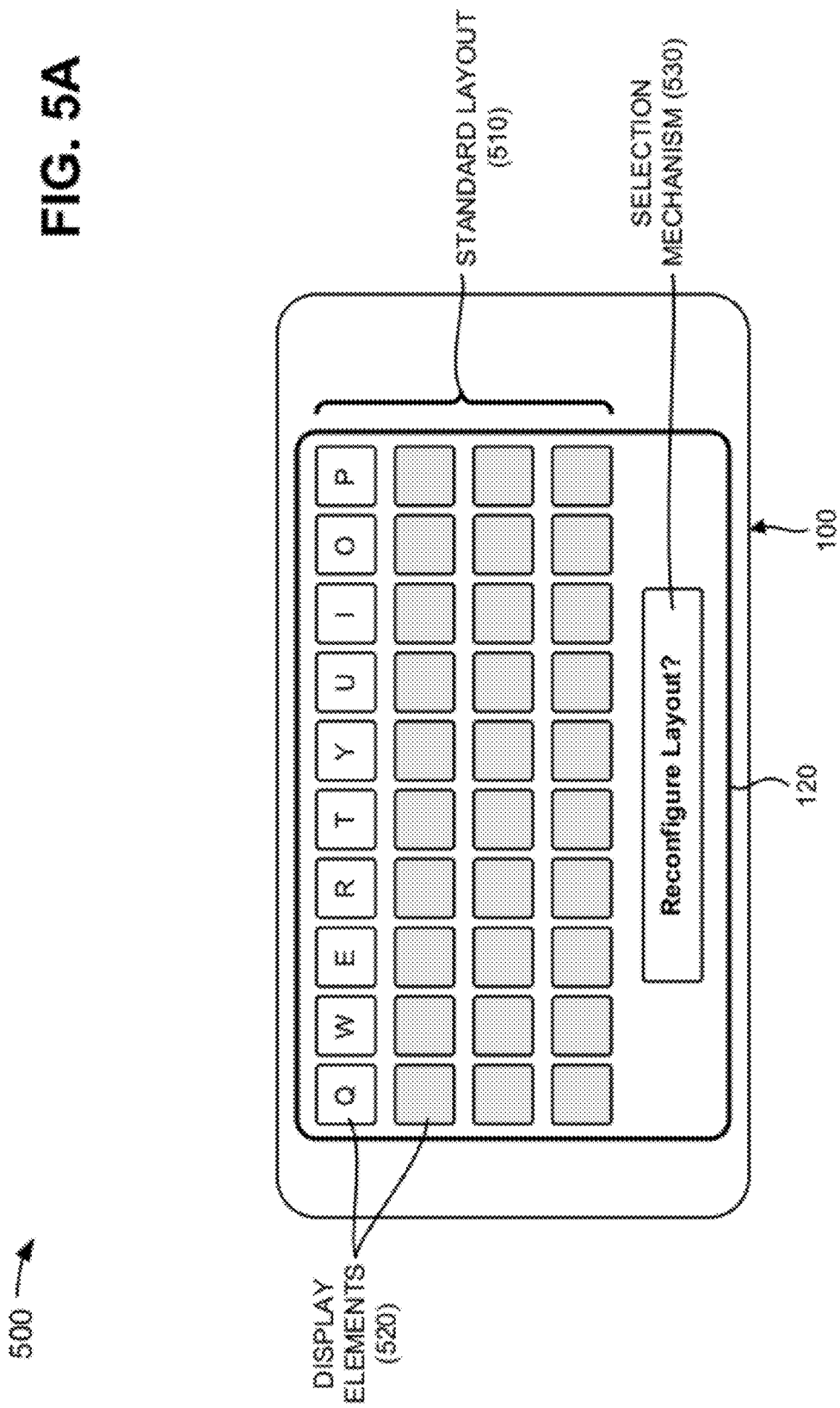

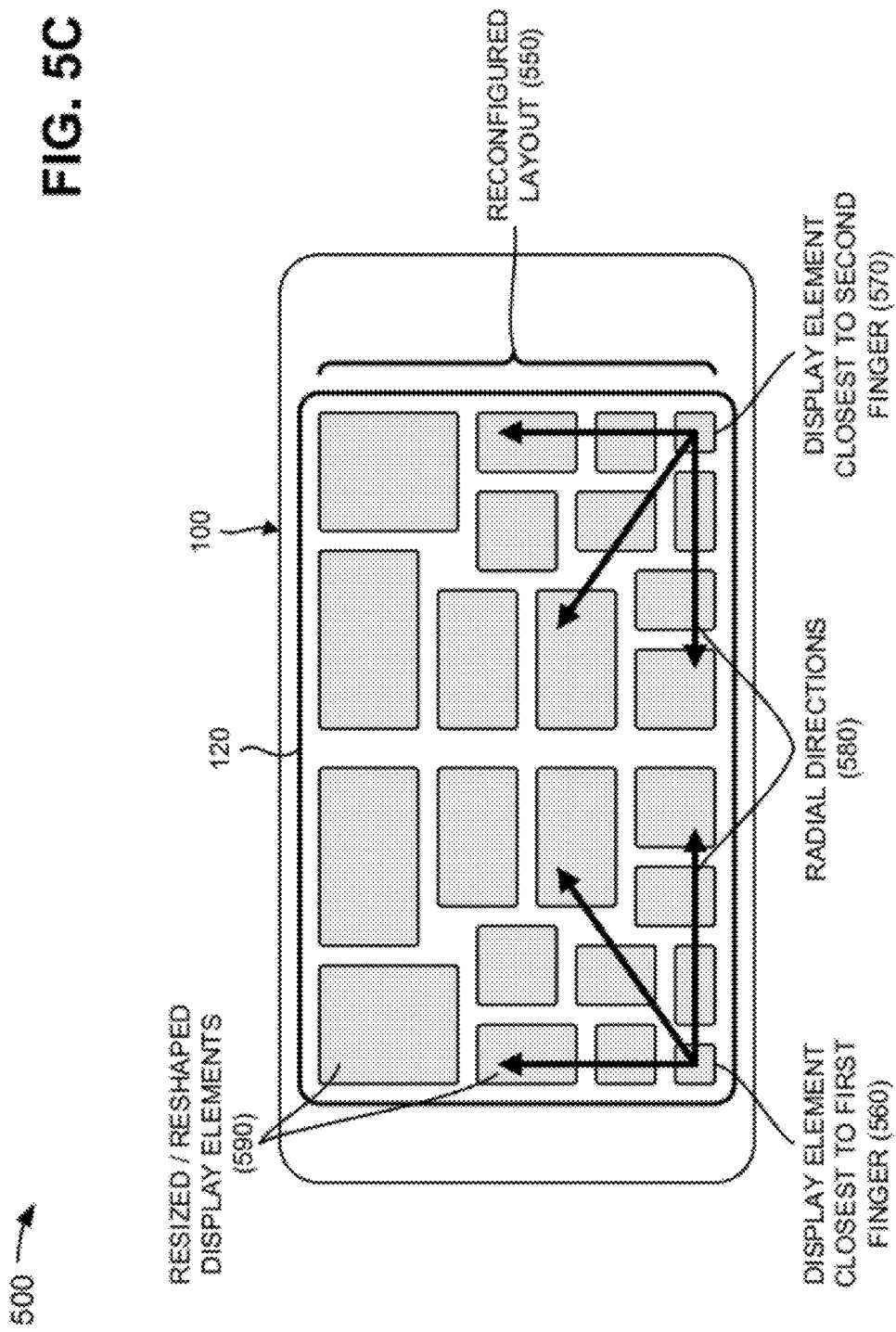

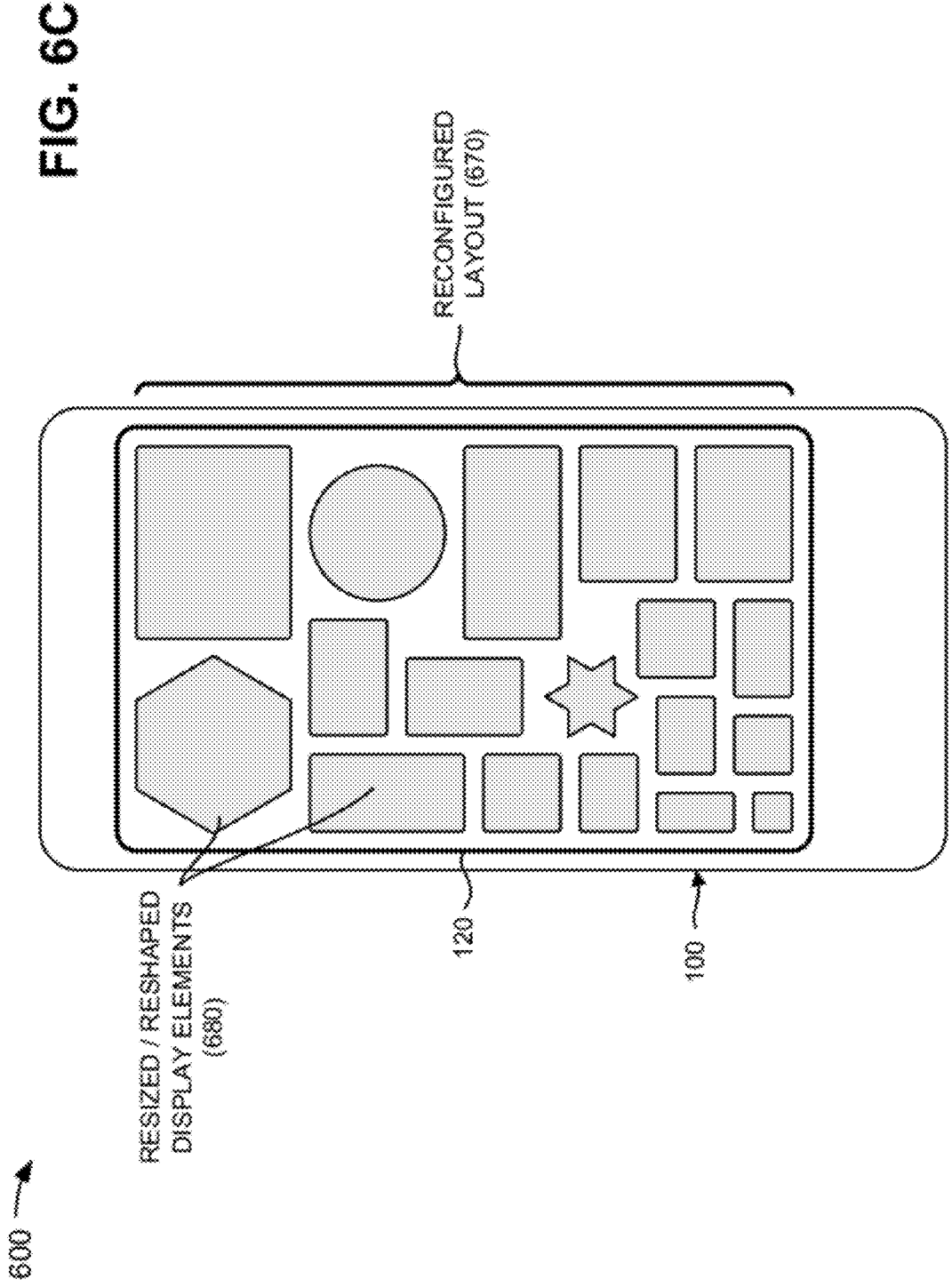

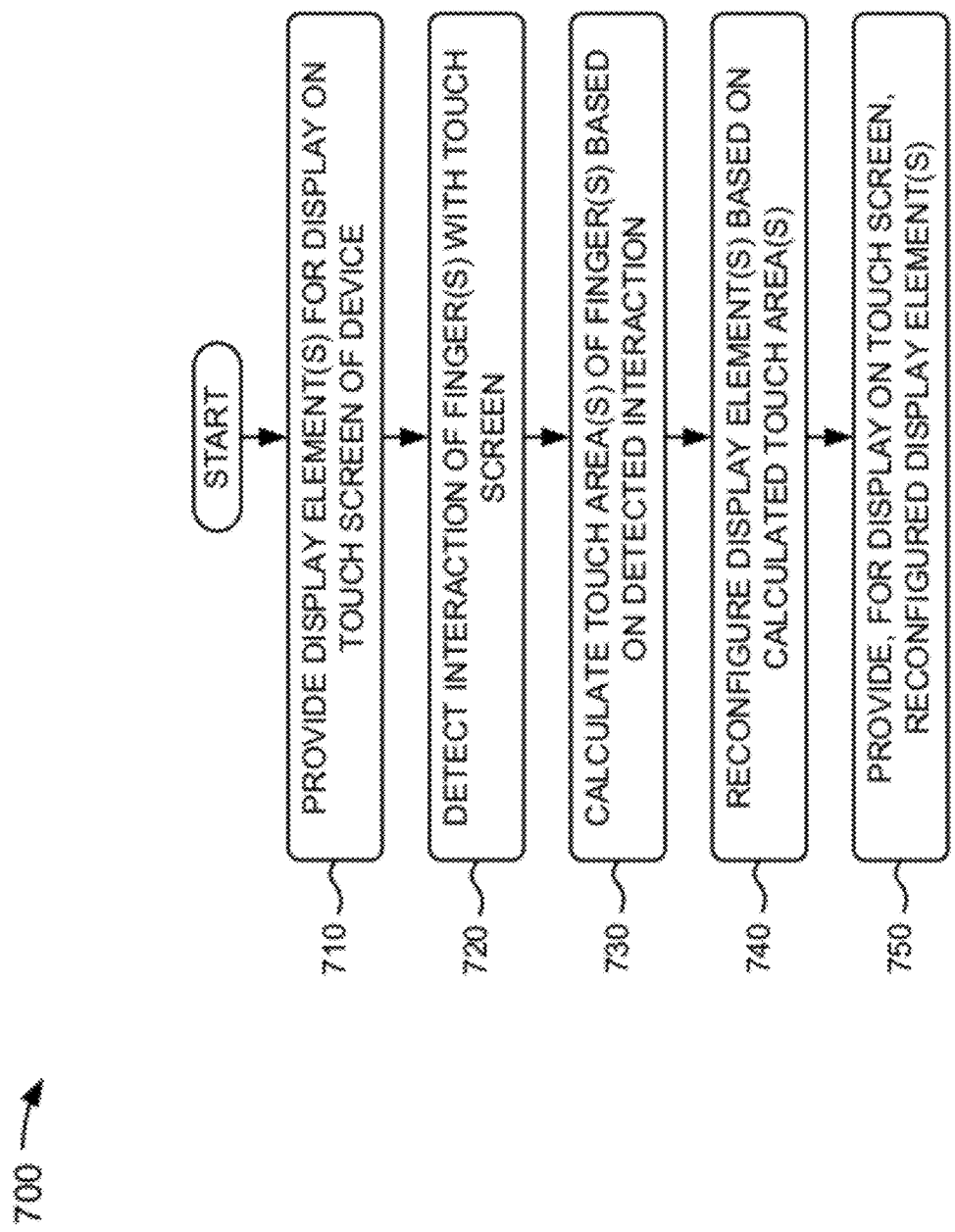

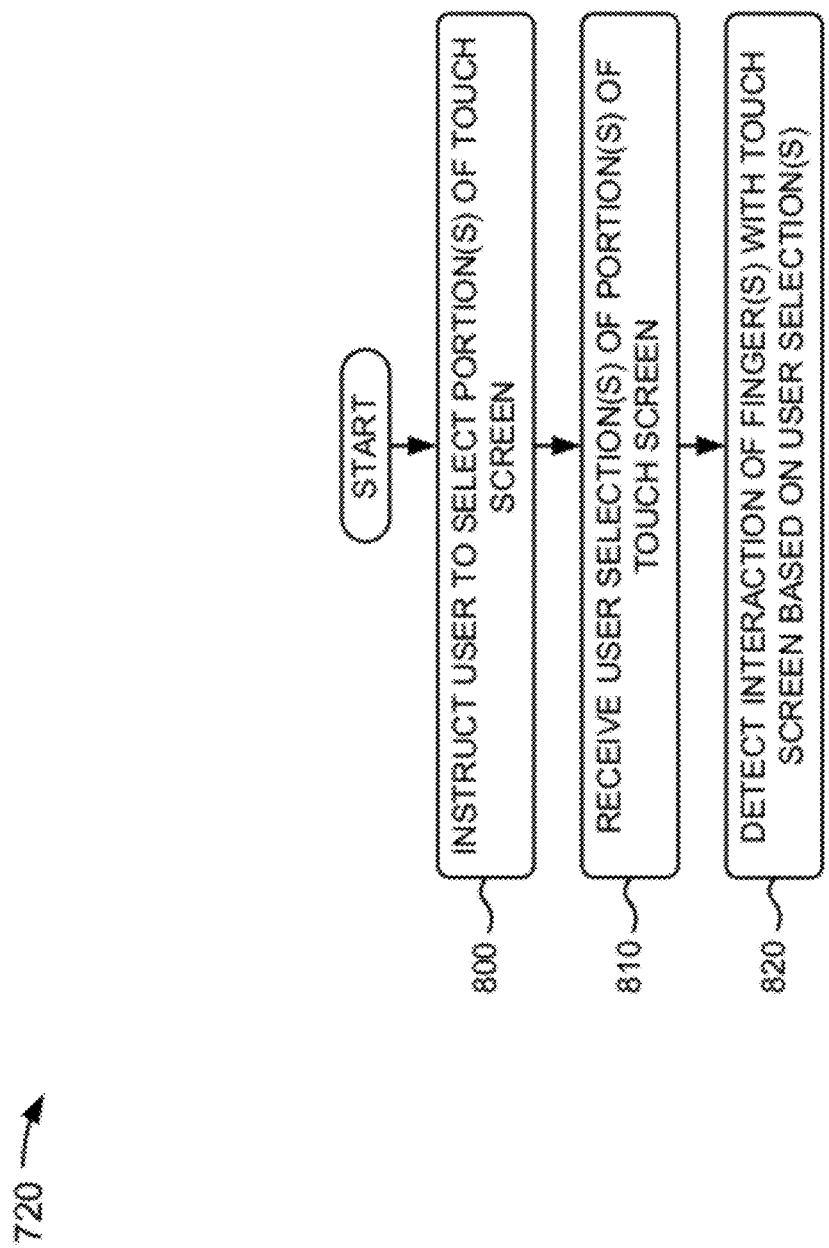

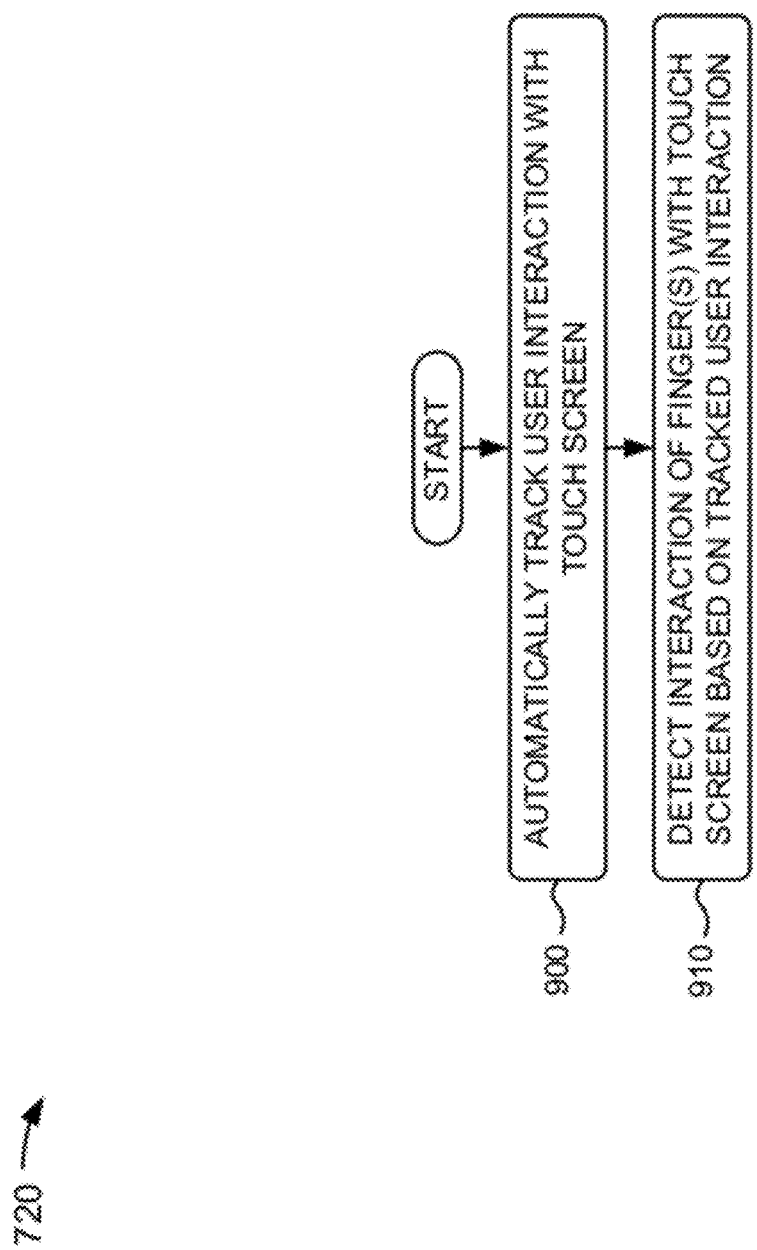

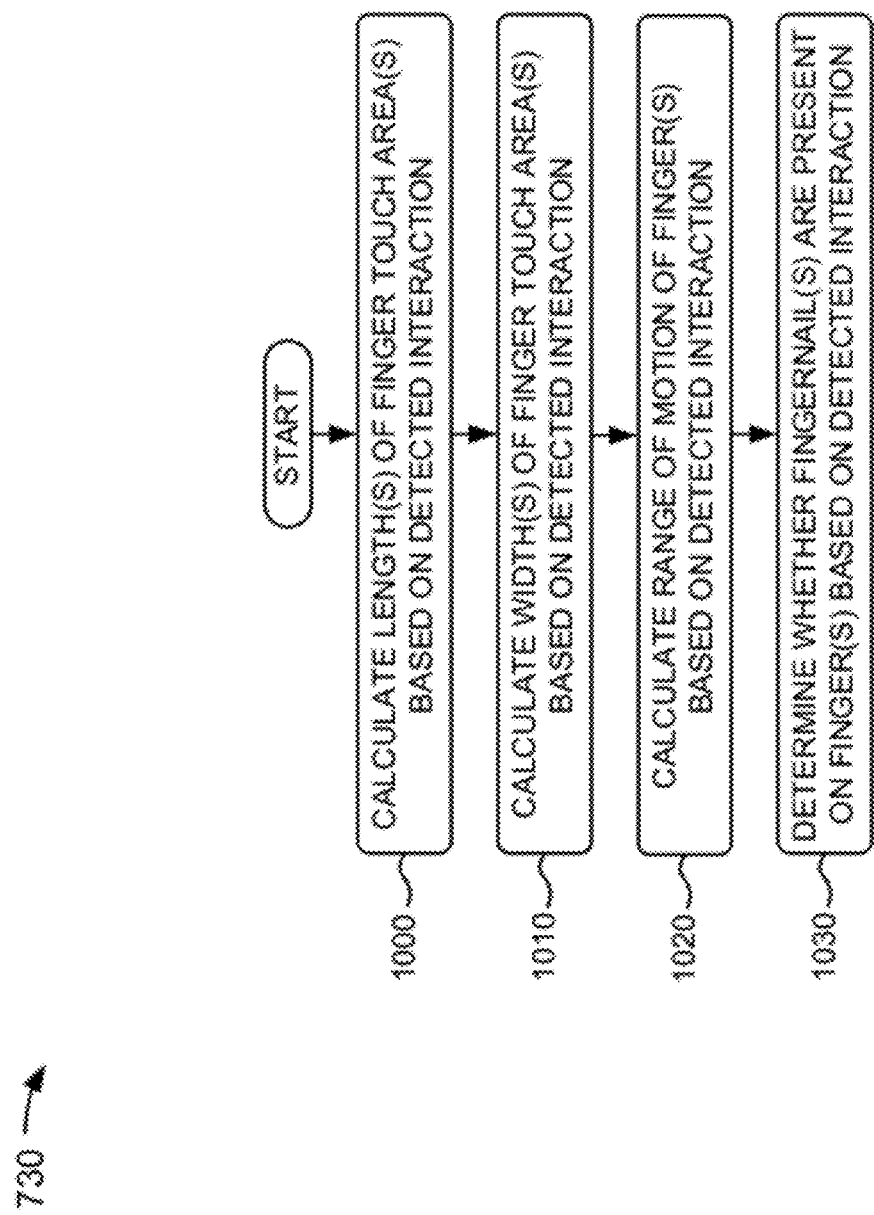

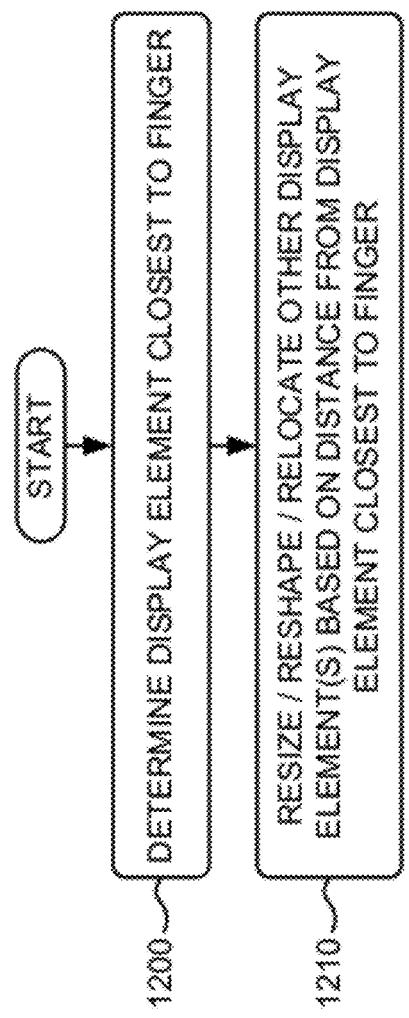

MORPHING TOUCH SCREEN LAYOUT

RELATED APPLICATION

This application is a continuation of U.S. patent application Ser. No. 12/340,243, filed Dec. 19, 2008, which is incorporated herein by reference.

BACKGROUND

Devices, such as mobile communication devices (e.g., cell phones, personal digital assistants (PDAs), etc.), include touch sensitive input devices (e.g., touch sensitive interfaces or displays, touch screens, etc.). Touch screens are usually formed with either a resistive or capacitive film layer, located above a display, which is used to sense a touch of the user's finger or a stylus. Some touch screens enable the user to input information (e.g., text, numbers, etc.) via a keyboard or a keypad displayed on the touch screen. However, the size of a touch screen may be limited due to the size of the device containing the touch screen. Smaller touch screens may display the keyboard or keypad with small keys arranged in close proximity to one another. The closely-arranged, small keys may be difficult to manipulate by the user. For example, the user's finger (e.g., which may be larger than such keys) may accidently select keys adjacent to a desired key, which may cause incorrect input to the device. Furthermore, different users may manipulate similar touch screens in different ways (e.g., via a single finger, via a thumb, via multiple fingers or thumbs, etc.). Thus, some users may experience even further difficulty in manipulating closely-arranged, small display elements (e.g., keys, icons, etc.).

BRIEF DESCRIPTION OF THE DRAWINGS

FIGS. 3A and 3B depict diagrams of exemplary components of a display of the device illustrated in FIG. 1;

FIGS. 4A-4E illustrate diagrams of exemplary layout reconfiguration operations capable of being performed by the device depicted in FIG. 1;

FIGS. 5A-5C depict diagrams of additional exemplary layout reconfiguration operations capable of being performed by the device illustrated in FIG. 1;

FIGS. 6A-6C illustrate diagrams of exemplary automatic layout reconfiguration operations capable of being performed by the device depicted in FIG. 1; and FIGS. 7-12 depict flow charts of an exemplary process for reconfiguring a touch screen layout according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may reconfigure a layout of a touch screen of a device (e.g., a cell phone, a PDA, a personal computer, a laptop computer, a remote control, etc.) so that the touch screen layout may be customized to a particular user. In one implementation, for example, the systems and/or methods may display one or more display elements on a touch screen of a device, and may detect the interaction of a finger(s) with the touch screen. The systems and/or methods may calculate one or more touch areas associated with the finger(s) based on the detected interaction, may reconfigure the display element(s) based on the calculated touch area(s), and may display the reconfigured display element(s) on the touch screen.

As used herein, the term "user" is intended to be broadly interpreted to include a device or a user and/or owner of a device. The term "touch screen" is intended to be broadly interpreted to include a touch screen display, a touch sensitive input device, a touch sensitive interface, etc. The term "touch area," as used herein, is intended to be broadly interpreted to include an area of a touch screen that contacts a user's finger when a user manipulates the touch screen. Furthermore, the term "display element," as used herein, is intended to be broadly interpreted to include a key (e.g., of a keypad or keyboard), an icon, a button, a menu, and/or any other mechanism capable of being displayed by a touch screen and selected by a user.

Figure 1:
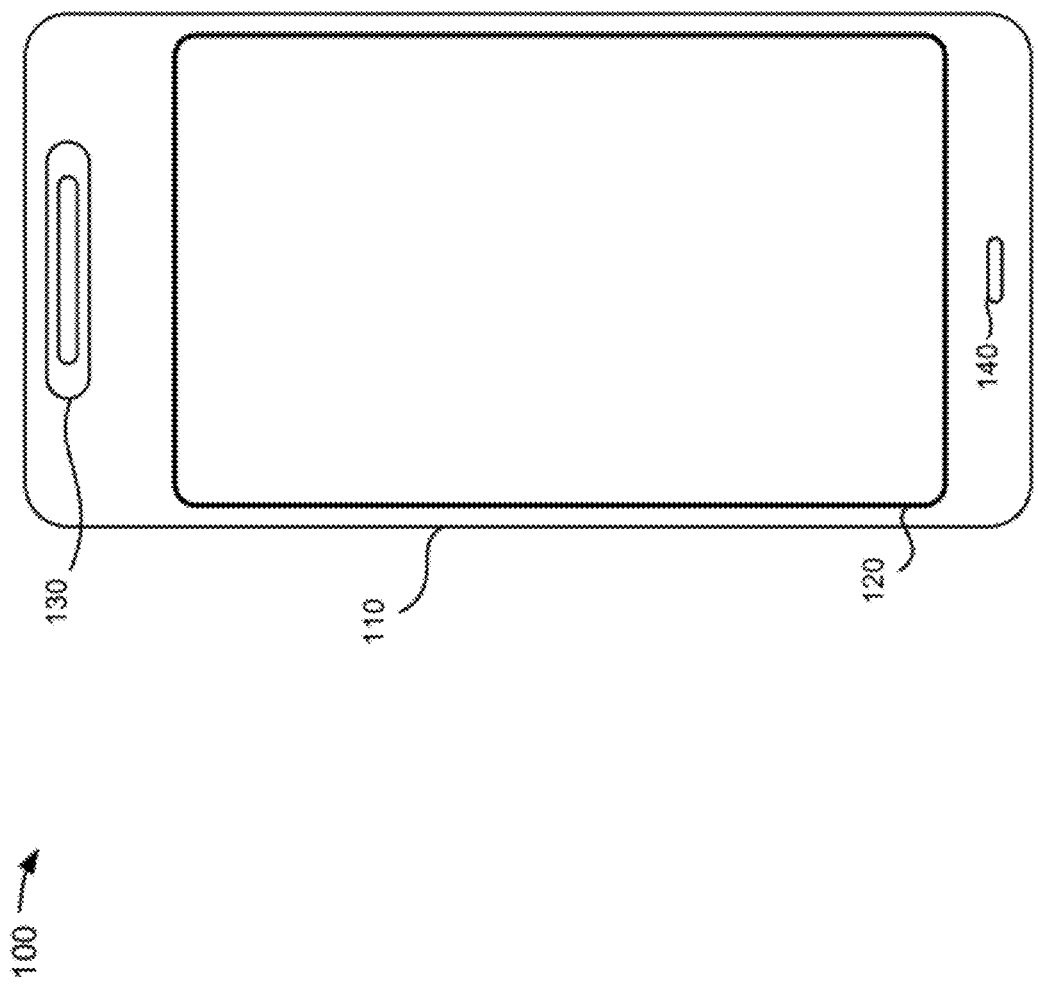
FIG. 1 depicts a diagram of an exemplary device in which systems and/or methods described herein may be implemented.

FIG. 1 is a diagram of an exemplary device 100 in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a film camera or a digital camera), a video camera (e.g., a camcorder), a calculator, binoculars, a telescope, a personal computer, a laptop computer, any other device capable of utilizing a touch screen display, a thread or process running on one of these devices, and/or an object executable by one of these devices.

As illustrated in FIG. 1, device 100 may include a housing 110, a display 120, a speaker 130, and/or a microphone 140.

Housing 110 may protect the components of device 100 from outside elements. Housing 110 may include a structure configured to hold devices and components used in device 100, and may be formed from a variety of materials. For example, housing 110 may be formed from plastic, metal, or a composite, and may be configured to support display 120, speaker 130, and/or microphone 140.

Display 120 may provide visual information to the user. For example, display 120 may display text input into device 100, text, images, video, and/or graphics received from another device, and/or information regarding incoming or outgoing calls or text messages, emails, media, games, phone books, address books, the current time, etc. In one implementation, display 120 may include a touch screen display that may be configured to receive a user input when the user touches display 120. For example, the user may provide an input to display 120 directly, such as via the user's finger, or via other devices, such as a stylus. User inputs received via display 120 may be processed by components and/or devices operating in device 100. The touch screen display may permit the user to interact with device 100 in order to cause device 100 to perform one or more operations. Further details of display 120 are provided below in connection with, for example, FIGS. 2-6C.

Speaker 130 may provide audible information to a user of device 100. Speaker 130 may be located in an upper portion of device 100, and may function as an ear piece when a user is engaged in a communication session using device 100.

Speaker 130 may also function as an output device for music and/or audio information associated with games and/or video images played on device 100.

Microphone 140 may receive audible information from the user. Microphone 140 may include a device that converts speech or other acoustic signals into electrical signals for use by device 100. Microphone 140 may be located proximate to a lower side of device 100.

Although FIG. 1 shows exemplary components of device 100, in other implementations, device 100 may contain fewer, different, differently arranged, or additional components than depicted in FIG. 1. In still other implementations, one or more components of device 100 may perform one or more other tasks described as being performed by one or more other components of device 100.

Figure 2:
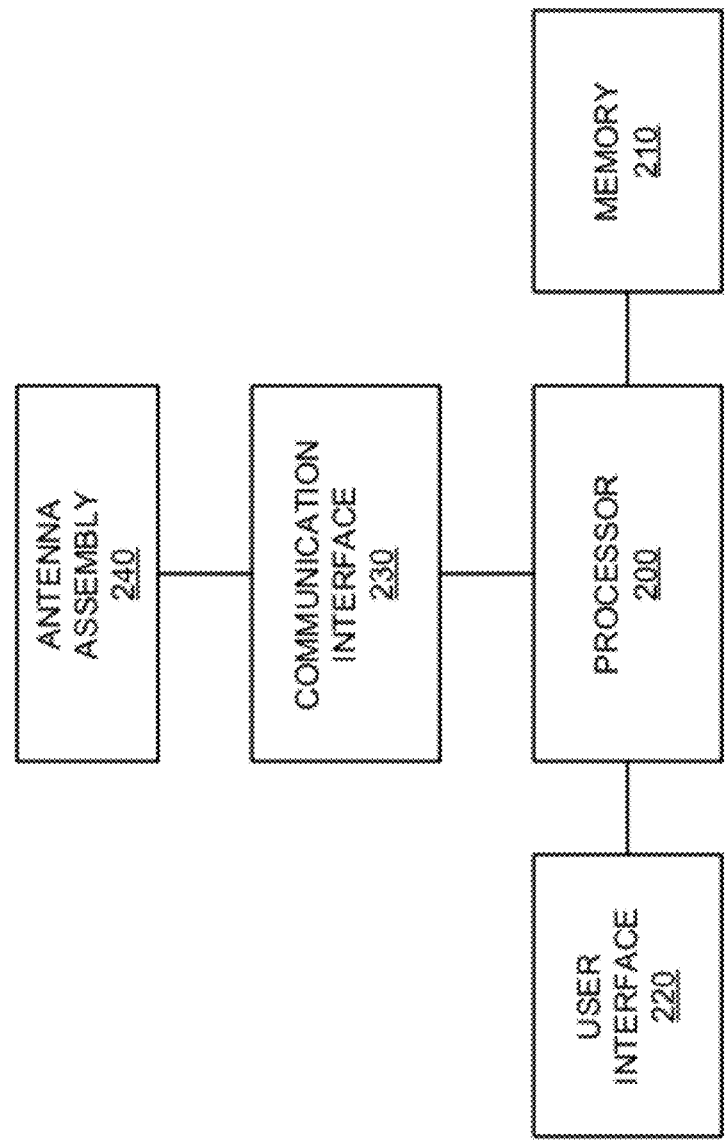
FIG. 2 illustrates a diagram of exemplary components of the device depicted in FIG. 1.

FIG. 2 illustrates a diagram of exemplary components of device 100. As illustrated, device 100 may include a processor 200, memory 210, a user interface 220, a communication interface 230, and/or an antenna assembly 240.

Processor 200 may include one or more microprocessors, application-specific integrated circuits (ASICs), field-programmable gate arrays (FPGAs), or the like. Processor 200 may control operation of device 100 and its components. In one implementation, processor 200 may control operation of components of device 100 in a manner described herein.

Memory 210 may include a random access memory (RAM), a read-only memory (ROM), and/or another type of memory to store data and instructions that may be used by processor 200.

User interface 220 may include mechanisms for inputting information to device 100 and/or for outputting information from device 100. Examples of input and output mechanisms might include buttons (e.g., control buttons, keys of a keypad, a joystick, etc.) or a touch screen interface (e.g., display 120) to permit data and control commands to be input into device 100; a speaker (e.g., speaker 130) to receive electrical signals and output audio signals; a microphone (e.g., microphone 140) to receive audio signals and output electrical signals; a display (e.g., display 120) to output visual information (e.g., text input into device 100); a vibrator to cause device 100 to vibrate; etc.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

As will be described in detail below, device 100 may perform certain operations described herein in response to processor 200 executing software instructions of an application contained in a computer-readable medium, such as memory 210. A computer-readable medium may be defined as a physical or logical memory device. The software instructions may be read into memory 210 from another computer-readable medium or from another device via communication interface 230. The software instructions contained in memory 210 may cause processor 200 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 100, in other implementations, device 100 may contain fewer, different, differently arranged, or additional components than depicted in FIG. 2. In still other implementations, one or more components of device 100 may perform one or more other tasks described as being performed by one or more other components of device 100.

FIGS. 3A and 3B depict diagrams of exemplary components of display 120 of device 100. As shown, display 120 may include a light source 300, a screen 310, and/or a sensing layer 320.

Light source 300 may include a mechanism (e.g., a backlight) that provides backlighting to a lower surface of screen 310 in order to display information. For example, light source 300 may include one or more incandescent light bulbs, one or more light-emitting diodes (LEDs), an electroluminescent panel (ELP), one or more cold cathode fluorescent lamps (CCFL), one or more hot cathode fluorescent lamps (HCFL), etc. that illuminate portions of screen 310. Incandescent light bulbs may be used when very high brightness is desired. LEDs may be used in small, inexpensive lighting arrangements, and may include colored or white light. An ELP may be used for larger lighting arrangements or when even lighting is desired, and may be either colored or white. CCFLs may be used in large lighting arrangements and may be white in color. In another example, light source 300 may employ one or more diffusers or light guides to provide even lighting from an uneven source. In still another example, light source 300 can include any color light source (e.g., yellow, green, blue, white, etc.) or any combination of colored/non-colored light sources. The light provided by light source 300 may also be used to provide front lighting to an upper surface of screen 310 that faces a user.

Screen 310 may include any mechanism capable of providing visual information (e.g., text, images, video, incoming or outgoing calls, games, phone books, the current time, emails, etc.) to a user. For example, screen 310 may include a liquid crystal display (LCD), such as a thin film transistor (TFT) LCD, etc. In one exemplary implementation, screen 310 may include a plastic substrate that arranges TFT on a metal foil (rather than on glass), which may permit screen 310 to recover its original shape after being bent. Screen 310 may include a color filter coated onto the plastic substrate, which may permit screen 310 to display color images. In other implementations, screen 310 may include a monochrome, flexible LCD.

In one implementation, screen 310 may include any number of color and/or monochrome pixels. In another implementation, screen 310 may include a passive-matrix structure or an active-matrix structure. In a further implementation, if screen 310 is a color array, each pixel may be divided into three cells, or subpixels, which may be colored red, green, and blue by additional filters (e.g., pigment filters, dye filters, metal oxide filters, etc.). Each subpixel may be controlled independently to yield numerous possible colors for each pixel. In other implementations, each pixel of screen 310 may include more or less than three subpixels of various colors other than red, green, and blue.

Sensing layer 320 may include a mechanism that detects the presence of a user's finger 330 (e.g., a thumb, an index finger, a middle finger, a ring finger, or a pinkie finger) on display 120, detects the location (or touch area) of finger 330 on display 120, determines how many fingers a user has on display 120, etc. For example, sensing layer 320 may include a layer of capacitive material (e.g., provided under a protective covering (not shown)) that may experience a change in electrical charges (e.g., a change in the amount of charge stored) when finger 330 contacts sensing layer 320. In one exemplary implementation, sensing layer 320 may include self capacitance circuitry that includes an array of electrodes and monitors changes in the array of electrodes when a user contacts sensing layer 320 (e.g., with finger 330). In another exemplary implementation, as shown in FIG. 3B, sensing layer 320 may include a layer of driving lines 340 that carry current, and a separate layer of sensing lines 350 that detect changes in electrical charge when a user contacts sensing layer 320 (e.g., with finger 330).

Sensing layer 320 may sense a change associated with its electrical properties every time a user contacts sensing layer 320, and may provide this information to processor 200 and/or memory 210. Processor 200 may utilize this information to determine a shape, a size, and/or a location of a user's finger (or fingers) on display 120. In one exemplary implementation, processor 200 may calculate touch area(s) associated with a user's finger(s) based on information received from sensing layer 320, and may reconfigure display element(s) (e.g., keys, icons, etc.) associated with display 120 based on the calculated touch area(s).

Although FIGS. 3A and 3B show exemplary components of display 120, in other implementations, display 120 may contain fewer, different, differently arranged, or additional components than depicted in FIGS. 3A and 3B. In still other implementations, one or more components of display 120 may perform one or more other tasks described as being performed by one or more other components of display 120.

FIGS. 4A-4E illustrate diagrams of exemplary layout reconfiguration operations 400 capable of being performed by device 100. In one implementation, the operations described in connection with FIGS. 4A-4E may be performed by processor 200 (FIG. 2). As shown in FIG. 4A, device 100 may include display 120. Display 120 may include the features described above in connection with FIGS. 1, 3A, and 3B. As further shown in FIG. 4A, display 120 may display a standard layout 410 (e.g., of one or more display elements 420) and/or a selection mechanism 430.

Standard layout 410 may include an arrangement of evenly-spaced, evenly-aligned, and/or uniformly-shaped display elements 420. Display elements 420 of standard layout 410 may be small and arranged in close proximity to one another, which may make display elements 420 difficult to manipulate with a user's finger. In one example, standard layout 410 may include a QWERTY-like layout (e.g., a traditional configuration of typewriter or computer keyboard keys) of keys (e.g., display elements 420). Each of the keys may be associated with and may display a corresponding character (e.g., a corresponding QWERTY character). In another example, as shown in FIG. 4A, standard layout 410 may include icons (e.g., display elements 420) associated with executable applications capable of being executed by device 100. The icons may display information associated with the executable application corresponding to the icons.

Each of display elements 420 may include a key (e.g., of a keypad or keyboard), an icon, a button, a menu, and/or any other mechanism capable of being displayed by display 120 and selected by a user. For example, as shown in FIG. 4A, display elements 420 may include icons associated with executable applications (e.g., an icon for an email application, an icon for a telephone application, an icon for an Internet application, an icon for a music application, etc.) capable of being executed by device 100.

Selection mechanism 430 may include may include a button, an icon, a link, and/or other similar selection mechanisms (e.g., instructions) that provide an option to reconfigure the layout (e.g., standard layout 410) displayed by device 100. In one implementation, if a user selects selection mechanism 430, device 100 may request the user to interact with display 120 (e.g., via finger 330), and may detect the interaction of the finger(s) with display 120. Device 100 may calculate touch area(s) associated with the finger(s) based on the detected interaction, and may reconfigure standard layout based on the calculated touch area(s).

If the user chooses selection mechanism 430, device 100 may provide one or more touch points 440 on display 120, and may request the user to select touch points 440 in the order provided on display 120, as shown in FIG. 4B. Touch points 440 may include buttons, icons, etc. arranged at different locations of display 120. In one example, touch points 440 may include numbers (e.g., "1," "2," "3," etc.) and may be arranged in numeric order at different locations of display 120. The number and arrangement of touch points 440 may be based on dimensions of display 120. In one implementation, touch points 440 may be arranged and numbered so that a representative portion (e.g., a majority) of display 120 may be selected via touch points 440. For example, as shown in FIG. 4B, touch points 440 may be provided in the four corners (e.g., as represented by numbers "1," "3," "7," and "9") of display 120, at a middle portion (e.g., as represented by numbers "4," "5," and "6") of display 120, and at other portions (e.g., as represented by numbers "2" and "8") of display 120. In other implementations, display 120 may contain fewer, different, differently arranged, or additional touch points 440 than depicted in FIG. 4B.

Device 100 may instruct the user to hold device 100 (e.g., as the user typically holds device 100), and may instruct the user to manipulate device 100 (e.g., to select touch points 440). For example, if a particular user is left-handed and uses his/her left thumb to manipulate device 100, the user may hold device 100 in his/her left hand, and may select (e.g., with his/her left thumb) touch points 440 in the order provided on display 120. In another example, if a user is right-handed and uses his/her right thumb to manipulate device 100, the user may hold device 100 in his/her right hand, and may select (e.g., with his/her right thumb) touch points 440 in the order provided on display 120. In still another example, if device 100 is rotated ninety degrees and a user uses both his/her left and right thumbs to manipulate device 100, the user may hold rotated device 100 in both hands, and may select (e.g., with his/her left thumb and/or right thumb) touch points 440 in the order provided on display 120. Further details of manipulation of a rotated device 100 are provided below in connection with, for example, FIGS. 5A-5C.

Device 100 may detect the interaction of the user's finger(s) with display 120 (e.g., via selection of touch points 440), and may calculate one or more touch areas associated with the user's finger(s) based on the detected interaction. For example, as shown in FIG. 4C, if the user's finger 330 selects one of touch points 440, device 100 may calculate a touch area 450 associated with finger 330. Touch area 450 may include an area of display 120 that contacts the user's finger 330 when the user manipulates display 120 (e.g., via selection of one of touch points 440). In one implementation, device 100 may calculate a length associated with touch area 450 at the particular touch point 440, may calculate a width associated with touch area 450 at the particular touch point 440, and/or may determine whether a fingernail is present on finger 330 based on touch area 450. The presence of fingernails may affect how a user manipulates device 100 (e.g., fingernails may make it difficult to accurately select portions of display 120). Device 100 may calculate touch areas 450 associated with each of the other touch points 440 in a similar manner, and may utilize this information to calculate a range of motion of the user's finger(s) (e.g., finger 330). For example, a left-handed user using his/her left thumb to manipulate display 120 may find it difficult to select touch point 440 located in the upper right corner of display 120 (e.g., as represented by number "3") if the user's left thumb is small.

Device 100 may reconfigure standard layout 410 based on the one or more calculated touch areas (e.g., touch area 450) associated with the user's finger(s) (e.g., finger 330). For example, as shown in FIG. 4D, device 100 may produce an exemplary reconfigured layout 460 based on the one or more calculated touch areas (e.g., touch area 450). Reconfigured layout 460 may include display elements 420 of standard layout 410, but device 100 may resize, reshape, relocate, etc. display elements 420 based on the one or more calculated touch areas (e.g., touch area 450) associated with the user's finger(s) (e.g., finger 330). In one implementation, device 100 may determine a display element 470 closest to the user's finger (e.g., based on the one or more calculated touch areas (e.g., touch area 450) associated with the user's finger), and may resize display element 470 as the smallest (or one of the smallest) display element of reconfigured layout 460. Reconfigured layout 460 may correspond to a layout determined for a left-handed user that holds a lower half of device 100 and uses his/her left thumb to manipulate display 120. Since reconfigured layout 460 may correspond to such a user, display element 470 may be provided in a lower left corner of display 120. Display element 470 may be arranged as the smallest display element since device 100 may have determined that this particular user created the smallest touch area (e.g., touch area 450) where display element 470 is located on display 120. In one example, device 100 may determine that smaller touch areas occur when they are closer to the user's finger, and larger touch areas occur when they are farther away from the user's finger.

As further shown in FIG. 4D, in one exemplary implementation, device 100 may resize, reshape, and/or relocate the remaining display elements 420 of standard configuration 410 based on radial directions 480 that extend away from display element 470. For example, reconfigured layout 460 may include one or more resized, reshaped, and/or relocated display elements 490. As shown in FIG. 4D, display elements 490 may increase in size as distances (e.g., in radial directions 480) from display element 470 increase, may be non-uniformly shaped, and/or may be non-uniformly aligned. Thus, reconfigured layout 460 may provide a layout for display 120 that may be customized to a user of device 100. In one implementation, device 100 may apply reconfigured layout 460 to any layout capable of being provided by display 120 (e.g., to a keyboard layout, to a home page layout, to a telephone keypad layout, etc.).

FIG. 4E depicts exemplary reconfigured layout 460 for a right-handed user that holds a lower half of device 100 and uses his/her right thumb to manipulate display 120. Reconfigured layout 460 of FIG. 4E may include the features described above in connection with FIG. 4D, except that display element 470 may be located in a bottom right corner of display 120 and display elements 490 may increase in size as distances (e.g., in radial directions 480) from display element 470 (e.g., provided in the bottom right corner of display 120) increase.

Although FIGS. 4A-4E show exemplary layout reconfiguration operations 400 associated with device 100, in other implementations, device 100 may perform fewer, different, or additional operations than depicted in FIGS. 4A-4E.

Figure 5B:
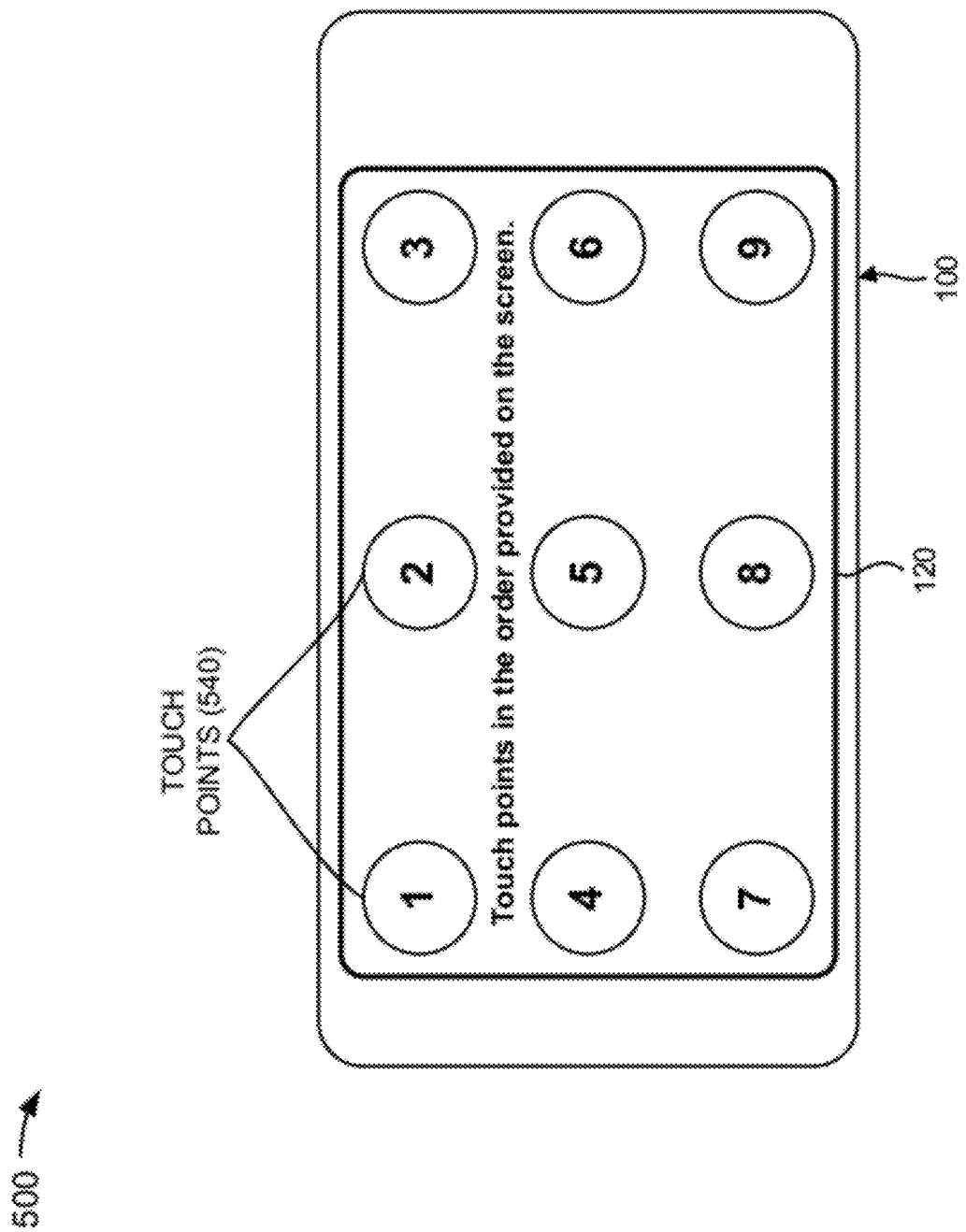

FIGS. 5A-5C depict diagrams of additional exemplary layout reconfiguration operations 500 capable of being performed by device 100. In one implementation, the operations described in connection with FIGS. 5A-5C may be performed by processor 200 (FIG. 2), and may be similar to operations 400 (FIGS. 4A-4E) except that device 100 may be rotated ninety degrees and that a user may use both his/her left and right thumbs to manipulate device 100. As shown in FIG. 5A, device 100 may include display 120. Display 120 may include the features described above in connection with FIGS. 1, 3A, and 3B. As further shown in FIG. 5A, display 120 may display a standard layout 510 (e.g., of one or more display elements 520) and/or a selection mechanism 530.

Standard layout 510 may include an arrangement of evenly-spaced, evenly-aligned, and/or uniformly-shaped display elements 520. Display elements 520 of standard layout 510 may be small and arranged in close proximity to one another, which may make display elements 520 difficult to manipulate with a user's finger. In one example, as shown in FIG. 5A, standard layout 510 may include a QWERTY-like layout (e.g., a traditional configuration of typewriter or computer keyboard keys) of keys (e.g., display elements 520). Each of the keys may be associated with and may display a corresponding character (e.g., a corresponding QWERTY character).

Each of display elements 520 may include a key (e.g., of a keypad or keyboard), an icon, a button, a menu, and/or any other mechanism capable of being displayed by display 120 and selected by a user. For example, as shown in FIG. 5A, display elements 520 may include keys of a QWERTY-like layout keyboard.

Selection mechanism 530 may include may include a button, an icon, a link, and/or other similar selection mechanisms (e.g., instructions) that provide an option to reconfigure the layout (e.g., standard layout 510) displayed by device 100. In one implementation, if a user selects selection mechanism 530, device 100 may request the user to interact with display 120 (e.g., via finger 330), and may detect the interaction of the finger(s) with display 120. Device 100 may calculate touch area(s) associated with the finger(s) based on the detected interaction, and may reconfigure standard layout based on the calculated touch area(s).

If the user chooses selection mechanism 530, device 100 may provide one or more touch points 540 on display 120, and may request the user to select touch points 540 in the order provided on display 120, as shown in FIG. 5B. Touch points 540 may include buttons, icons, etc. arranged at different locations of display 120. In one example, touch points 540 may include numbers (e.g., "1," "2," "3," etc.) and may be arranged in numeric order at different locations of display 120. The number and arrangement of touch points 540 may be based on dimensions of display 120. In one implementation, touch points 540 may be arranged and numbered so that a representative portion (e.g., a majority) of display 120 may be selected via touch points 540. For example, as shown in FIG. 5B, touch points 540 may be provided in the four corners (e.g., as represented by numbers "1," "3," "7," and "9") of display 120, at a middle portion (e.g., as represented by numbers "4," "5," and "6") of display 120, and at other portions (e.g., as represented by numbers "2" and "8") of display 120. In other implementations, display 120 may contain fewer, different, differently arranged, or additional touch points 540 than depicted in FIG. 5B.

Device 100 may instruct the user to hold device 100 (e.g., as the user typically holds device 100), and may instruct the user to manipulate device 100 (e.g., to select touch points 540). For example, if device 100 is rotated ninety degrees and a user uses both his/her left and right thumbs to manipulate device 100, the user may hold rotated device 100 in both hands, and may select (e.g., with his/her left thumb and/or right thumb) touch points 540 in the order provided on display 120.

Device 100 may detect the interaction of the user's finger(s) with display 120 (e.g., via selection of touch points 540), and may calculate one or more touch areas (e.g., touch area 450) associated with the user's finger(s) based on the detected interaction. In one implementation, device 100 may calculate a length associated with touch area 450 at the particular touch point 540, may calculate a width associated with touch area 450 at the particular touch point 540, and/or may determine whether a fingernail is present on the user's finger based on touch area 450. Device 100 may calculate touch areas 450 associated with each of the other touch points 540 in a similar manner, and may utilize this information to calculate a range of motion of the user's finger(s) (e.g., left and/or right thumbs). For example, a user using his/her left and right thumbs to manipulate display 120 may find it difficult to select touch point 540 located in the upper middle portion of display 120 (e.g., as represented by number "2") if the user's left and right thumbs are small.

Device 100 may reconfigure standard layout 510 based on the one or more calculated touch areas (e.g., touch area 450) associated with the user's finger(s) (e.g., left and/or right thumbs). For example, as shown in FIG. 5C, device 100 may produce an exemplary reconfigured layout 550 based on the one or more calculated touch areas (e.g., touch area 450). Reconfigured layout 550 may include display elements 520 of standard layout 510, but device 100 may resize, reshape, relocate, etc. display elements 520 based on the one or more calculated touch areas (e.g., touch area 450) associated with the user's finger(s) (e.g., left and/or right thumbs). In one implementation, device 100 may determine a display element 560 closest to the user's first finger (e.g., based on the one or more calculated touch areas associated with the user's left thumb), and may resize display element 560 as the smallest (or one of the smallest) display elements of reconfigured layout 550. Device 100 may determine a display element 570 closest to the user's second finger (e.g., based on the one or more calculated touch areas associated with the user's right thumb), and may resize display element 570 as the smallest (or one of the smallest) display elements of reconfigured layout 550.

Reconfigured layout 550 may correspond to a layout determined for a user that holds device 100 with both hands and uses his/her left and right thumbs to manipulate display 120. Since reconfigured layout 550 may correspond to such a user, display element 560 may be provided in a lower left corner of display 120 and display element 570 may be provided in a lower right corner of display 120. Display elements 560 and 570 may be arranged as the smallest display elements since device 100 may have determined that this particular user created the smallest touch areas (e.g., touch area 450) where display elements 560 and 570 are located on display 120.

As further shown in FIG. 5C, in one exemplary implementation, device 100 may resize, reshape, and/or relocate the remaining display elements 520 of standard configuration 510 based on radial directions 580 that extend away from display elements 560 and 570. For example, reconfigured layout 550 may include one or more resized, reshaped, and/or relocated display elements 590. As shown in FIG. 5C, display elements 590 may increase in size as distances (e.g., in radial directions 580) from display elements 560 and 570 increase, may be non-uniformly shaped, and/or may be non-uniformly aligned. Thus, reconfigured layout 550 may provide a layout for display 120 that may be customized to a user of device 100. In one implementation, device 100 may apply reconfigured layout 550 to any layout capable of being provided by display 120 (e.g., to a keyboard layout, to a home page layout, to a telephone keypad layout, etc.).

Although FIGS. 5A-5C show exemplary layout reconfiguration operations 500 associated with device 100, in other implementations, device 100 may perform fewer, different, or additional operations than depicted in FIGS. 5A-5C.

Figure 6A:
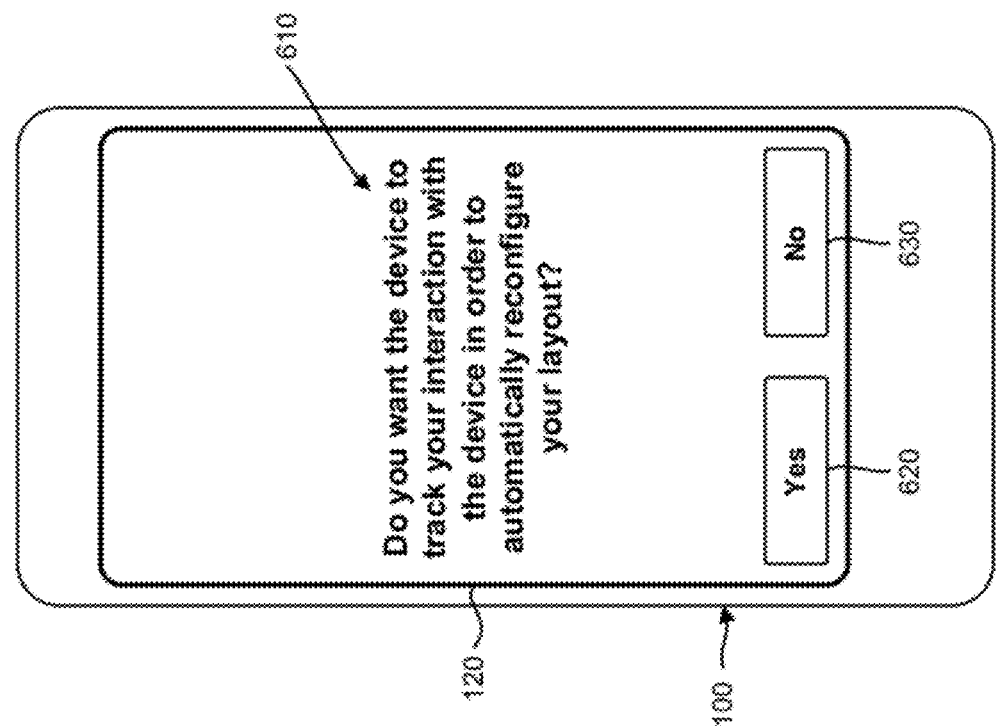
Figure 6B:
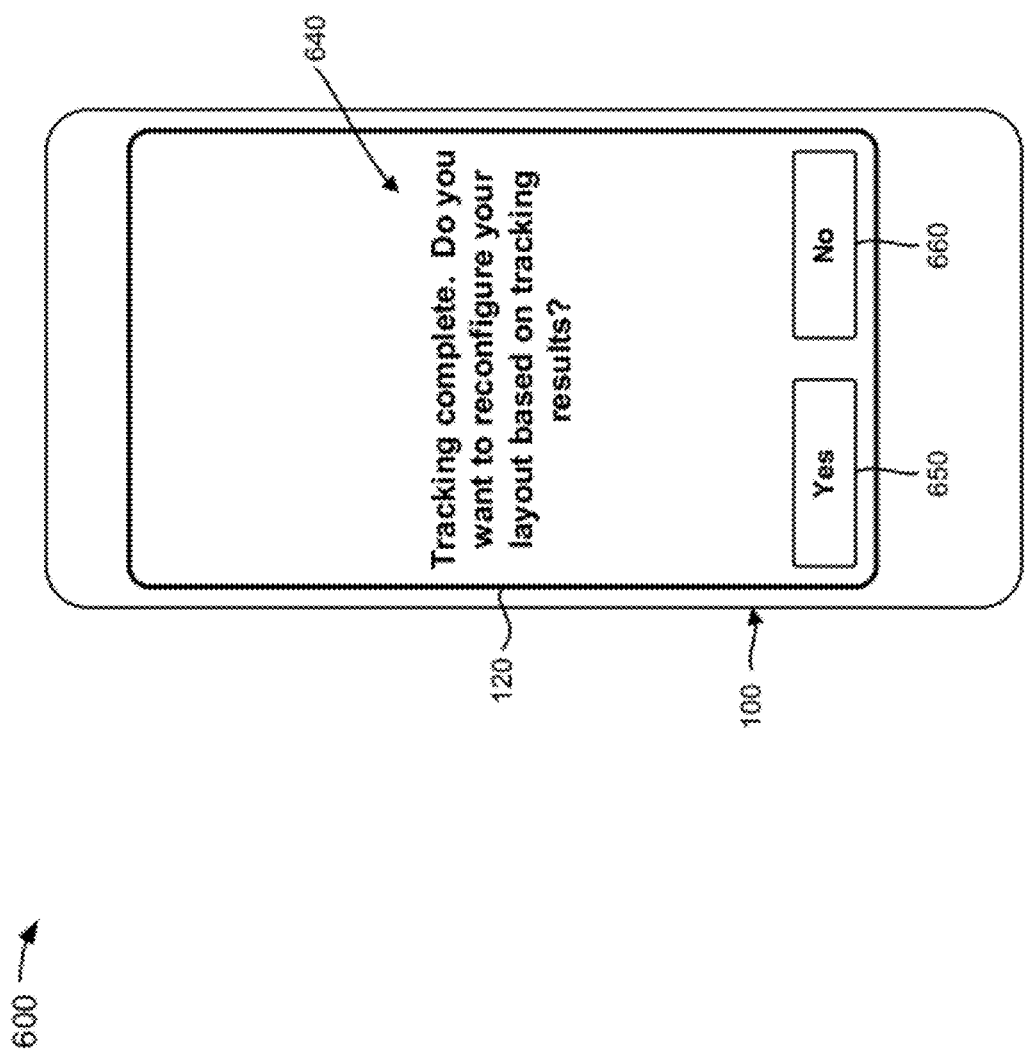

FIGS. 6A-6C illustrate diagrams of exemplary automatic layout reconfiguration operations 600 capable of being performed by device 100. In one implementation, the operations described in connection with FIGS. 6A-6C may be performed by processor 200 (FIG. 2). As shown in FIG. 6A, device 100 may include display 120. Display 120 may include the features described above in connection with FIGS. 1, 3A, and 3B. As further shown in FIG. 6A, display 120 may include information 610, a first selection mechanism 620, and a second selection mechanism 630.

Information 610 may ask a user whether the user wants device 100 to track user interaction with device 100 in order to automatically reconfigure one or more layouts provided by display 120. In other implementations, information 610 may be omitted and the user may select an automatic layout reconfiguration option or an interaction tracking option from a menu provided by device 100 (e.g., via a home page, a settings menu, an options menu, etc. provided by display 120).

First selection mechanism 620 may include a button, an icon, a link, and/or other similar selection mechanisms (e.g., a "Yes" button) that, when selected, instructs device 100 to track the user's interaction with device 100. Second selection mechanism 630 may include a button, an icon, a link, and/or other similar selection mechanisms (e.g., a "No" button) that, when selected, instructs device 100 to not track the user's interaction with device 100. In other implementations, selection mechanisms 620 and 630 may be omitted and device 100 may automatically track the user's interaction with device 100 and/or may permit the user to enable such automatic interaction tracking. In such an arrangement, device 100 may offer the user the option of reconfiguring one or more layouts provided by display 120 based on the user's interaction with device 100.

If the user selects first selection mechanism 620 (or if the user enables automatic interaction tracking), device 100 may automatically track the user's interactions with display 120. In one implementation, device 100 may track the user's interactions with display 120 for a certain time period, until a certain number of user touches are received by display 120, etc. In other implementations, device 100 may track user's interactions with display 120 until device 100 determines (e.g., to a certain degree of reliability, such as 90% accuracy) lengths associated with the user's touch areas, widths associated with the user's touch areas, a range of motion associated with the user's fingers, etc.

When automatic tracking of the user's interactions are complete, device 100 may provide (e.g., via display 120) the user interface depicted in FIG. 6B. As shown in FIG. 6B, display 120 may include information 640, a first selection mechanism 650, and a second selection mechanism 660.

Information 640 may ask the user whether the user wants device 100 to reconfigure one or more layouts provided by display 120 based on the tracking results. In other implementations, information 640 may be omitted and the user may select an automatic layout reconfiguration option from a menu provided by device 100 (e.g., via a home page, a settings menu, an options menu, etc. provided by display 120).

First selection mechanism 650 may include a button, an icon, a link, and/or other similar selection mechanisms (e.g., a "Yes" button) that, when selected, instructs device 100 to reconfigure one or more layouts provided by display 120 based on the tracking results. Second selection mechanism 660 may include a button, an icon, a link, and/or other similar selection mechanisms (e.g., a "No" button) that, when selected, instructs device 100 to not reconfigure one or more layouts provided by display 120. In other implementations, selection mechanisms 650 and 660 may be omitted and device 100 may automatically reconfigure one or more layouts provided by display 120 based on the user's interaction with device 100.

If the user selects first selection mechanism 650 (or if the user enables automatic layout reconfiguration), device 100 may automatically reconfigure one or more layouts provided by display 120 based on the tracking results. In one implementation, device 100 may automatically reconfigure one or more layouts provided by display 120, based on the tracking results, in the manner described above in connection with FIGS. 4A-4E. In another implementation, device 100 may automatically reconfigure one or more layouts provided by display 120, based on the tracking results, in the manner described above in connection with FIGS. 5A-5C.

In an exemplary implementation, device 100 may automatically reconfigure one or more layouts provided by display 120, based on the tracking results, to produce a reconfigured layout 670, as depicted in FIG. 6C. Reconfigured layout 670 may include a variety of resized, reshaped, relocated, etc. display elements 680. In one implementation, reconfigured layout 670 may include the features described above in connection with reconfigured layout 460 (FIGS. 4D and 4E) and/or reconfigured layout 550 (FIG. 5C). As shown in FIG. 6C, display elements 680 may be non-uniformly sized, may be non-uniformly shaped, may include a variety of shapes (e.g., square, rectangular, circular, octagonal, star-shaped, etc.), may be non-uniformly spaced, etc. In one implementation, display elements 680 may include the features described above in connection with display elements 490 (FIGS. 4D and 4E) and/or display elements 590 (FIG. 5C).

Although FIGS. 6A-6C show exemplary automatic layout reconfiguration operations 600 associated with device 100, in other implementations, device 100 may perform fewer, different, or additional operations than depicted in FIGS. 6A-6C.

FIGS. 7-12 depict flow charts of an exemplary process 700 for reconfiguring a touch screen layout according to implementations described herein. In one implementation, process 700 may be performed by device 100. In another implementation, some or all of process 700 may be performed by another device or group of devices, including or excluding device 100.

As illustrated in FIG. 7, process 700 may begin with providing one or more display elements for display on a touch screen of a device (block 710), and detecting interaction of one or more fingers with the touch screen (block 720). For example, in implementations described above in connection with FIGS. 4A-4C, display 120 may display standard layout 410 that includes one or more display elements 420. Standard layout 410 may include an arrangement of evenly-spaced, evenly-aligned, and/or uniformly-shaped display elements 420. Display elements 420 of standard layout 410 may be small and arranged in close proximity to one another, which may make display elements 420 difficult to manipulate with a user's finger. Device 100 may provide one or more touch points 440 on display 120, and may request the user to select touch points 440 in the order provided on display 120. Device 100 may detect the interaction of the user's finger(s) with display 120 via selection of touch points 440.

As further shown in FIG. 7, one or more touch areas associated with the finger(s) may be calculated based on the detected interaction (block 730), the display element(s) may be reconfigured based on the calculated touch area(s) (block 740), and the reconfigured display element(s) may be provided for display on the touch screen (block 750). For example, in implementations described above in connection with FIGS. 4C and 4D, device 100 may calculate one or more touch areas associated with the user's finger(s) based on the detected interaction. In one example, if the user's finger 330 selects one of touch points 440, device 100 may calculate a touch area 450 associated with finger 330. Touch area 450 may include an area of display 120 that contacts the user's finger 330 when the user manipulates display 120 (e.g., via selection of one of touch points 440). Device 100 may reconfigure standard layout 410 based on the one or more calculated touch areas (e.g., touch area 450) associated with the user's finger(s) (e.g., finger 330). In one example, device 100 may produce reconfigured layout 460 based on the one or more calculated touch areas (e.g., touch area 450). Reconfigured layout 460 may include display elements 420 of standard layout 410, but device 100 may resize, reshape, relocate, etc. display elements 420 based on the one or more calculated touch areas (e.g., touch area 450) associated with the user's finger(s) (e.g., finger 330).

Process block 720 may include the process blocks illustrated in FIG. 8. As shown in FIG. 8, process block 720 may include instructing a user to select one or more portions of the touch screen (block 800), receiving user selection(s) of the portion(s) of the touch screen (block 810), and detecting the interaction of the finger(s) with the touch screen based on the user selection(s) (block 820). For example, in implementations described above in connection with FIG. 4B, device 100 may provide one or more touch points 440 on display 120, and may request the user to select touch points 440 in the order provided on display 120. In one example, if a particular user is left-handed and uses his/her left thumb to manipulate device 100, the user may hold device 100 in his/her left hand, and may select (e.g., with his/her left thumb) touch points 440 in the order provided on display 120. In another example, if device 100 is rotated ninety degrees and a user uses both his/her left and right thumbs to manipulate device 100, the user may hold rotated device 100 in both hands, and may select (e.g., with his/her left thumb and/or right thumb) touch points 440 in the order provided on display 120. Device 100 may detect the interaction of the user's finger(s) with display 120 via selection of touch points 440.

Alternatively and/or additionally, process block 720 may include the process blocks illustrated in FIG. 9. As shown in FIG. 9, process block 720 may include automatically tracking user interaction with the touch screen (block 900), and detecting the interaction of the finger(s) with the touch screen based on the tracked user interaction (block 910). For example, in implementations described above in connection with FIG. 6A, device 100 may automatically track the user's interactions with display 120. In one example, device 100 may track the user's interactions with display 120 for a certain time period, until a certain number of user touches are received by display 120, etc. In another example, device 100 may track user's interactions with display 120 until device 100 determines (e.g., to a certain degree of reliability, such as 90% accuracy) lengths associated with the user's touch areas, widths associated with the user's touch areas, a range of motion associated with the user's fingers, etc.

Process block 730 may include the process blocks illustrated in FIG. 10. As shown in FIG. 10, process block 730 may include calculating length(s) of finger touch area(s) based on the detected interaction (block 1000), calculating width(s) of the finger touch area(s) based on the detected interaction (1010), calculating a range of motion associated with the finger(s) based on the detected interaction (1020), and/or determining whether fingernail(s) are present on the finger(s) based on the detected interaction (block 1030). For example, in implementations described above in connection with FIG. 4C, device 100 may calculate a length associated with touch area 450 at the particular touch point 440, may calculate a width associated with touch area 450 at the particular touch point 440, and/or may determine whether a fingernail is present on finger 330 based on touch area 450. Device 100 may calculate touch areas 450 associated with each of the other touch points 440 in a similar manner, and may utilize this information to calculate a range of motion of the user's finger(s) (e.g., finger 330). In one example, device 100 may calculate a touch orientation (e.g., from the right side or the left side of device 100) based on calculated touch areas 450.

Figure 11:
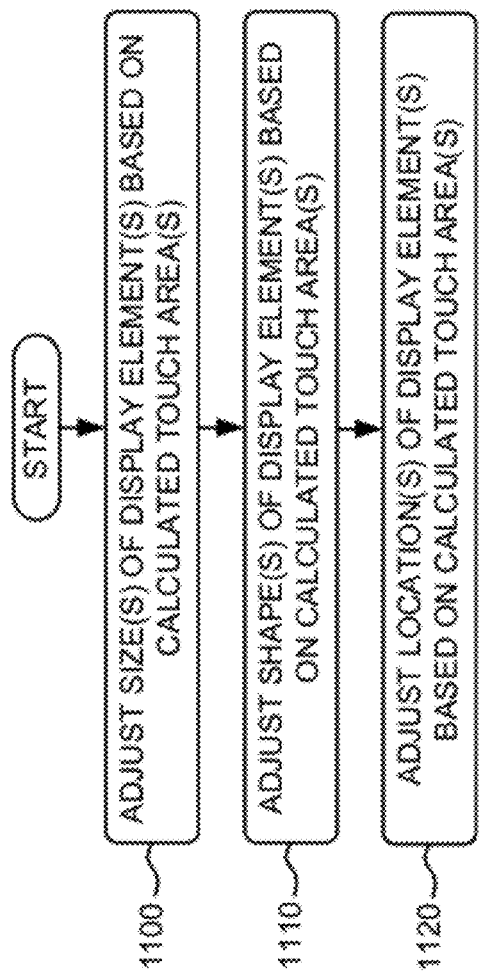

Process block 740 may include the process blocks illustrated in FIG. 11. As shown in FIG. 11, process block 740 may include adjusting size(s) of the display element(s) based on the calculated touch area(s) (block 1100), adjusting shape(s) of the display element(s) based on the calculated touch area(s) (block 1110), and adjusting location(s) of the display element(s) based on the calculated touch area(s) (block 1120). For example, in implementations described above in connection with FIG. 4D, device 100 may reconfigure standard layout 410 based on the one or more calculated touch areas (e.g., touch area 450) associated with the user's finger(s) (e.g., finger 330). In one example, device 100 may produce reconfigured layout 460 based on the one or more calculated touch areas (e.g., touch area 450). Reconfigured layout 460 may include display elements 420 of standard layout 410, but device 100 may resize, reshape, relocate, etc. display elements 420 based on the one or more calculated touch areas (e.g., touch area 450) associated with the user's finger(s) (e.g., finger 330). In one example, reconfigured layout 460 may include one or more resized, reshaped, and/or relocated display elements 490.

Alternatively and/or additionally, process block 740 may include the process blocks illustrated in FIG. 12. As shown in FIG. 12, process block 740 may include determining a display element closest to the finger (block 1200), and resizing, reshaping, and relocating other display element(s) based on a distance from the display element closest to the finger (block 1210). For example, in implementations described above in connection with FIG. 4D, device 100 may determine display element 470 closest to the user's finger (e.g., based on the one or more calculated touch areas (e.g., touch area 450) associated with the user's finger), and may resize display element 470 as the smallest (or one of the smallest) display element of reconfigured layout 460. Device 100 may resize, reshape, and/or relocate the remaining display elements 420 of standard configuration 410 based on radial directions 480 that extend away from display element 470. Display elements 490 may increase in size as distances from display element 470 increase, may be non-uniformly shaped, and/or may be non-uniformly aligned.

Systems and/or methods described herein may reconfigure a layout of a touch screen of a device so that the touch screen layout may be customized to a particular user. In one implementation, for example, the systems and/or methods may display one or more display elements on a touch screen of a device, and may detect the interaction of a finger(s) with the touch screen. The systems and/or methods may calculate one or more touch areas associated with the finger(s) based on the detected interaction, may reconfigure the display element(s) based on the calculated touch area(s), and may display the reconfigured display element(s) on the touch screen.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7-12, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    causing, by one or more processors, a plurality of display elements to be displayed on a touch screen;
    detecting, by the one or more processors, an interaction by a user with an area of the touch screen; and
    adjusting, by the one or more processors and on the touch screen, respective appearances of two or more display elements of the plurality of display elements,
        the adjusting of the respective appearances of the two or more display elements including:
            determining a first distance between a first display element, of the two or more display elements, and the area,
            determining a second distance between a second display element, of the two or more display elements, and the area, and
            resizing the first display element based on a comparison of the first distance and the second distance.

2. The method of claim 1, the adjusting of the respective appearances of the two or more display elements further including at least one of:

reshaping a visual appearance of the first display element, or relocating the first display element on the touch screen.

3. The method of claim 1, each of the two or more display elements including at least one of:
a representation of a key associated with a keyboard image or a keypad image displayed on the touch screen, or
an icon displayed on the touch screen.

4. The method of claim 1, the detecting of the interaction including:
detecting a plurality of user inputs associated with the touch screen the area of the touch screen being identified based on the plurality of user inputs.

5. The method of claim 1, further comprising:
identifying, based on the interaction, information that includes at least one of:
a length associated with the area,
a width associated with the area, or
a range of motion associated with the interaction, and
determining the area of the touch screen based on the information.

6. The method of claim 1, the area being one of a plurality of areas associated with the interaction.

7. The method of claim 1, the resizing of the first display element including:
adjusting a first size, of the first display element, to be larger than a second size, of the second display element, when the second distance exceeds the first distance.

8. A device comprising:
a processor to:
cause a display to present a plurality of display elements,
detect an input selecting a particular display element of the plurality of display elements,
determine respective distances between the particular display element and non-selected display elements of the plurality of display elements,
identify, based on the respective distances, two or more display elements of the non-selected display elements, and
adjust respective sizes of the two or more display elements on the display,
the size for each display element, of the two or more display elements, being adjusted in proportion to a corresponding distance, of the respective distances, relative to other respective distances, of the respective distances, associated with other display elements.

9. The device of claim 8, the processor, when adjusting the respective sizes of the two or more display elements, being further to:
cause the display to present a first display element, of the two or more display elements, larger than a second display element, of the two or more display elements,
the first display element being associated with a first distance, of the respective distances, that is smaller than a second distance, of the respective distances, associated with the second display element.

10. The device of claim 8, the processor, when detecting the input selecting the particular display element, being further to:
detect an interaction, by a user, with one or more areas of the display,
the particular display element being identified based on the one or more areas of the display.

11. The device of claim 8, the processor, being further to:
determine, based on the input, information that includes at least one of:
a length associated with the input,
a width associated with the input, or
a range of motion associated with the input, and
identify the particular display element based on the information.

12. The device of claim 8, each of the two or more display elements including at least one of:
a representation of a key associated with a keyboard image or a keypad image presented on the display, or
an icon presented on the display.

13. The device of claim 8, the processor, adjusting the respective sizes of the two or more display elements, being further to, at least one of:
reshape a display element included in the two or more display elements, or
reposition the display element.

14. The device of claim 8, the display being a touch screen, and the processor, when detecting the input, being further to:
determine a contact area associated with a user input,
identify the particular display element based on the contact area.

15. A non-transitory computer-readable medium to store instructions, the instructions comprising:
one or more instructions that, when executed by a processor, cause the processor to:
render a plurality of display elements on a display,
detect an input associated with an area of the display,
determine respective distances between the area and the plurality of display elements,
identify, based on the respective distances, two or more display elements of the display elements, and
adjust respective sizes, on the display, of the two or more display elements in proportion to two or more distances, of the respective distances, corresponding to the two or more display elements.

16. The non-transitory computer-readable medium of claim 15, the one or more instructions, to adjust the respective sizes of the two or more display elements, further including:
at least one instruction to cause the display to present a first display element, of the two or more display elements, smaller than a second display element, of the two or more display elements,
the first display element being associated with a first distance, of the respective distances, that is smaller than a second distance, of the respective distances, associated with the second display element.

17. The non-transitory computer-readable medium of claim 15, the instructions further comprising:
at least one instruction to:
determine at least one of:
a length associated with the input,
a width associated with the input, or
a range of motion associated with the input, and
identify the area based on the at least one of the length, the width, or the range of motion.

18. The non-transitory computer-readable medium of claim 15, each of the two or more display elements corresponding to at least one of:
a representation of a key associated with a keyboard image or a keypad image presented on the display, or
an icon presented on the display.

19. The non-transitory computer-readable medium of claim 15, the one or more instructions, to adjust the respective sizes of the two or more display elements, further including at least one of:
at least one instruction to reshape at least one of the two or more display elements, or at least one instruction to reposition at least one of the two or more display elements.

20. The non-transitory computer-readable medium of claim 15, the display being a touch screen, and
the one or more instructions, to detect the input, further including:
at least one instruction to:
determine a contact area associated with the input, and
identify the area of the display based on the contact area.

\* \* \* \* \*